United States Patent
Patel et al.

(10) Patent No.: US 6,306,969 B1
(45) Date of Patent: Oct. 23, 2001

(54) SHRINK FILM HAVING BALANCED PROPERTIES OR IMPROVED TOUGHNESS AND METHODS OF MAKING THE SAME

(75) Inventors: Rajen M. Patel; Jacquelyn A. deGroot, both of Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/308,142

(22) Filed: May 13, 1999

Related U.S. Application Data

(63) Continuation-in-part of application No. 08/748,322, filed on Nov. 13, 1996, now Pat. No. 5,972,444, which is a continuation-in-part of application No. 08/842,190, filed on Apr. 23, 1997, now abandoned.

(51) Int. Cl.[7] .................................................. C08L 23/16
(52) U.S. Cl. ........................ 525/191; 525/240; 428/35.7
(58) Field of Search ................................. 525/191, 240; 428/35.7

(56) References Cited

U.S. PATENT DOCUMENTS

| | | | |
|---|---|---|---|
| 4,457,960 | 7/1984 | Newsome | 428/35 |
| 4,547,433 | 10/1985 | Ohya et al. | 428/516 |
| 4,820,557 | 4/1989 | Warren | 428/34.9 |
| 4,863,769 | 9/1989 | Lustig et al. | 428/34.9 |
| 4,952,451 | 8/1990 | Mueller | 428/218 |
| 5,059,481 | 10/1991 | Lustig et al. | 428/39.9 |
| 5,256,428 | 10/1993 | Lustig et al. | 426/127 |
| 5,272,236 | 12/1993 | Lai et al. | 526/348.5 |
| 5,278,272 | 1/1994 | Lai et al. | 526/348.5 |
| 5,397,613 | 3/1995 | Georgelos | 428/36.7 |
| 5,397,640 | 3/1995 | Georgelos et al. | 428/349 |
| 5,451,450 | 9/1995 | Erderly et al. | 428/220 |
| 5,460,861 | 10/1995 | Vicik et al. | 428/34.9 |
| 5,562,958 | 10/1996 | Walton et al. | 428/34.9 |
| 5,593,747 | 1/1997 | Georgelos | 428/36.7 |
| 5,604,043 | 2/1997 | Ahlgren | 428/518 |
| 5,629,059 | 5/1997 | Desai et al. | 428/34.9 |
| 5,677,383 | * 10/1997 | Chum et al. | 525/240 |

FOREIGN PATENT DOCUMENTS

| | | |
|---|---|---|
| 0 436 196 A2 | 7/1991 | (EP) . |
| 0 572 034 A2 | 12/1993 | (EP) . |
| 0 737 713 A1 | 10/1996 | (EP) . |
| 94/25523 | 11/1994 | (WO) . |
| 95/10566 | 4/1995 | (WO) . |
| 96/12762 | 5/1996 | (WO) . |

OTHER PUBLICATIONS

International Search Report dated Mar. 11, 1998 issued by the EPO acting as the International Seraching Autority in PCT/US97/20573.

International Search Report dated Mar. 30, 1998 issued by the EPO acting as the International Seraching Autority in PCT/US97/20574.

* cited by examiner

*Primary Examiner*—Nathan M. Nutter

(57) ABSTRACT

This invention relates to an improved shrink film obtained by selectively controlling and optimizing the melt index and density differential between at least two polyolefin polymer components to provide narrow density splits. One aspect of this invention relates to a biaxially oriented polyolefin shrink film having balanced properties and another aspect of this invention relates to an oriented shrink film having improved toughness. This invention also relates to a biaxial orientation method of making an improved shrink film using elaborate shrink orientation techniques such as tenter framing, double-bubble, trapped bubble, tape orientation or combination thereof. Most preferably, the first polyolefin polymer component is a lower density, substantially linear ethylene/α-olefin interpolymer and the second polyolefin polymer component is a higher density, heterogeneously branched ethylene/α-olefin interpolymer.

17 Claims, 4 Drawing Sheets

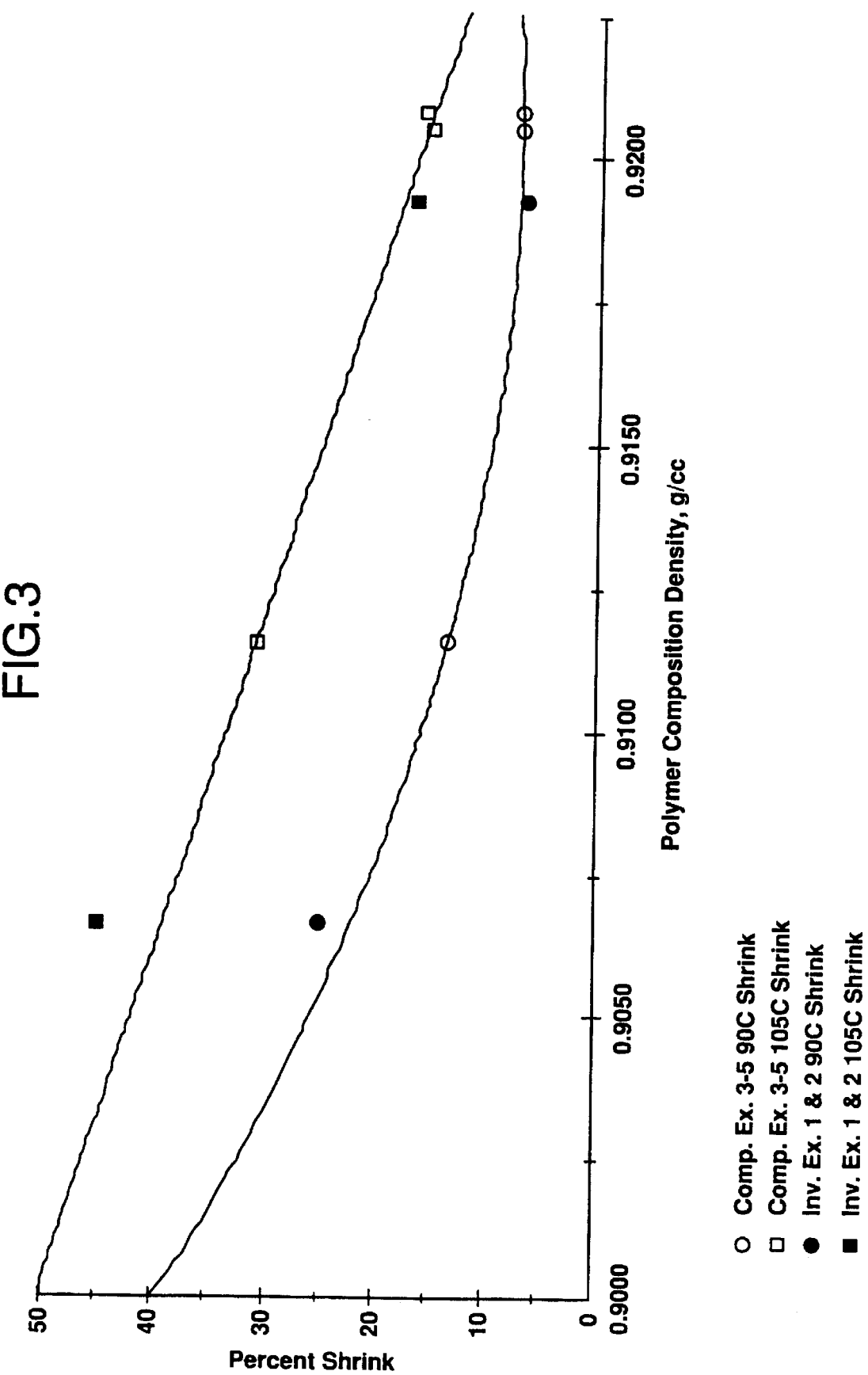

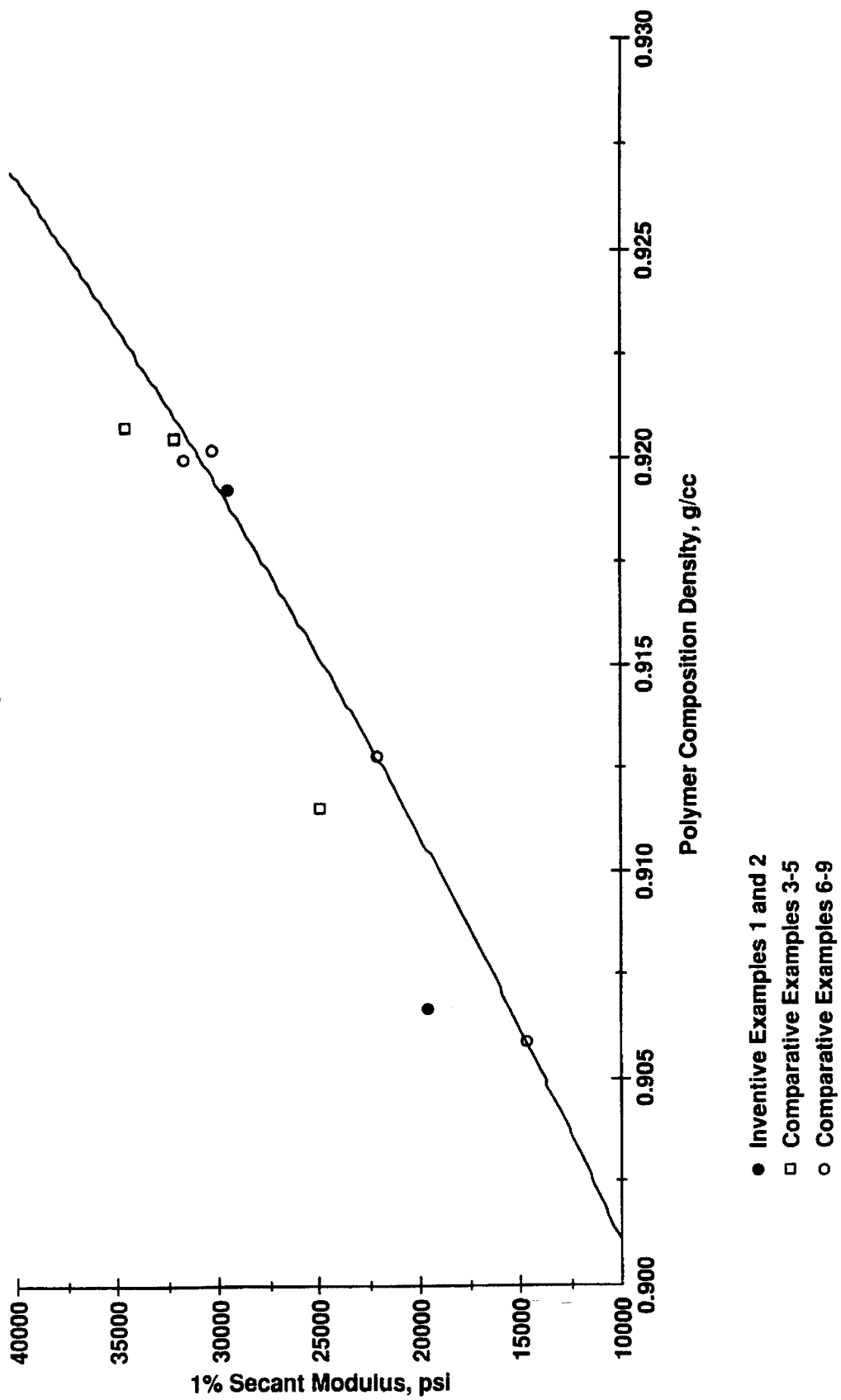

SHRINK FILM HAVING BALANCED PROPERTIES OR IMPROVED TOUGHNESS AND METHODS OF MAKING THE SAME

CROSS-REFERENCES TO RELATED APPLICATIONS

This application is a 37 CFR § 371 application of PCT/US97/20573, filed Nov. 13, 1997, which is a continuation in part of U.S. application Ser. No. 08/748,322, filed Nov. 13, 1996, and now U.S. Pat. No. 5,972,444 and U.S. application Ser. No. 08/842,190, filed Apr. 23, 1997, and now abandoned, is also a continuation-in-part of U.S. application Ser. No. 08/748,322.

STATEMENT REGARDING FEDERALLY SPONSORED RESEARCH OR DEVELOPMENT

Not Applicable

REFERENCE TO A "MICROFICHE APPENDIX"

Not Applicable

FIELD OF THE INVENTION

This invention relates to an improved shrink film-obtained by selectively controlling and optimizing the density differential between at least two polyolefin polymer components to provide narrow density splits. One aspect of the invention relates to a biaxially oriented polyolefin shrink film having balanced properties and comprising a polymer composition, the polymer composition comprising and made from (A) a first ethylene polymer component having a single differential scanning calorimetry (DSC) melting peak and a single Analytical Temperature Rising Elution Fractionation (ATREF) peak and (B) a second ethylene polymer component having one or more DSC melting peaks, wherein the density differential between component(A) and component (B) is in the range from 0 to 0.03 g/cc. Another aspect of the invention relates to an oriented shrink film having improved toughness and comprising a polymer composition, the polymer composition comprising and made from at least one lower density, homogeneously branched ethylene polymer (C) and at least one higher density, higher molecular weight ethylene polymer (D) wherein the density differential between the two polymer components is in the range of 0.001 to 0.05 g/cc. This invention also relates to a biaxial orientation method of making a shrink film having balanced properties and a method of making an oriented shrink film having improved toughness.

DESCRIPTION OF THE RELATED ART

Food items such as poultry, fresh red meat and cheese, as well as nonfood industrial and retail goods, are packaged by various heat shrink film methods. Heat shrink films can be monoaxial or biaxial oriented and are required to possess variety of film attributes. For example, in addition to a high shrink response, for successful use in hot-fill or cook-in applications, shrink films must also possess a relatively high softening point.

There are two main categories of heat shrink films—hot-blown shrink film and oriented shrink film. Hot-blown shrink film is made by a hot-blown simple bubble film process and, conversely, oriented shrink film is made by elaborate biaxial orientation processes known as double bubble, tape bubble, trapped bubble or tenter framing. Both amorphous and semi-crystalline polymers can be made into oriented shrink films using elaborate biaxial orientation processes. For amorphous polymers, the orientation is performed at a temperature immediately above the glass transition temperature of the polymer. For semi-crystalline polymers, the orientation is performed at a temperature below the peak melting point of the polymer.

Shrink packaging generally involves placing an item(s) into a bag (or sleeve) fabricated from a heat shrink film, then closing or heat sealing the bag, and thereafter exposing the bag to sufficient heat to cause shrinking of the bag and intimate contact between the bag and item. The heat that induces shrinkage can be provided by conventional heat sources, such as heated air, infrared radiation, hot water, hot oil combustion flames, or the like. Heat shrink wrapping of food items helps preserve freshness, is attractive, hygienic, and allows closer inspection of the quality of the packaged food item. Heat shrink wrapping of industrial and retail goods, which is alternatively referred to in the art and herein as industrial and retail bundling, preserves product cleanliness and also is a convenient means of bundling and collating for accounting and transporting purposes.

The biaxial heat;shrink response of shrink film is obtained by initially stretching fabricated film to an extent several times its original dimensions in both the machine and transverse directions to orient the film. The stretching is usually accomplished while the fabricated film is sufficiently soft or molten, although cold drawn shrink films are also known in the art. After the fabricated film is stretched and while still in a stretched condition, the stretching or orientation is frozen or set in by quick quenching of the film. Subsequent application of heat will then cause the oriented film to relax and, depending on the actual shrink temperature, the oriented film can return essentially back to its original unstretched dimensions, i.e., to shrink relative to its stretched dimension.

The orientation window and shrink response of oriented films is affected by-resin properties and fabrication parameters. The orientation window depends upon the broadness of the resin melting range and, as such, relates directly to the short chain branching distribution of the resin. In general, ethylene alpha-olefin interpolymers having a broad short chain branching distribution and broad melting range (e.g., heterogeneously branched ultra low density polyethylene resins such as ATTANE™ resins supplied by The Dow Chemical Company) exhibit a wide orientation window compared to ethylene alpha-olefin interpolymers characterized as having a narrow short chain branching distribution and narrow melting range (e.g., homogeneously branched linear ethylene polymers such as EXCEED™ and EXACT™ resins supplied by Exxon Chemical Corporation).

Polyolefin film shrinkage depends on shrink tension and film density. Film shrinkage is decreased as the orientation temperature is increased due to lower shrink tension. Film shrinkage is increased at lower density (lower crystallinity) because crystallites provide topological constraints and, as such, hinder free shrinkage. Conversely, for a given draw ratio, shrink tension depends on the crystallinity of the resin at the orientation temperature.

While the temperature at which a particular polymer is sufficiently soft or molten is a critical factor in various orientation techniques, such temperatures are ill-defined in the art. Disclosures pertaining to oriented films that disclose various polymer types (which invariably have varying polymer crystallinities and melting points), simply do not define the stretching or orientation temperatures used for the reported comparisons. U.S. Pat. No. 4,863,769 to Lustig et al., WO 95/00333 to Eckstein et al., and WO 94/07954 to Garza et al. are two examples of such disclosures.

The direct effect of density or crystallinity on shrink response and other desired shrink film properties such as, for example, impact resistance, are known, for example, from WO 95/08441, the disclosure of which is incorporated herein by reference. That is, even where the orientation temperature is presumably constant, lower density polymer films will show a higher shrink response and improved impact resistance. However, the effects of density and other resin properties on the orientation temperature is not well-known. In the prior art, there are only general rules of thumb or generalized teachings relating to suitable stretching or orientation conditions. For example, in commercial operations, it is often said that the temperature at which the film is suitably soft or molten is just above its respective glass transition temperature, in the case of amorphous polymers, or below its respective melting point, in the case of semi-crystalline polymers.

While the effects of density and other resin properties on the optimum orientation temperature of polyolefins are generally unknown, it is clear that heterogeneously branched ethylene polymers such as ATTANE™ resins and DOWLEX™ resin have a relatively broad orientation window (i.e., the temperature range at which the resin can be substantially stretched when molten or softened). It is also clear that softening temperatures and other film properties such as, for example, secant modulus, tend to decrease at lower polymer densities. Because of these relationships, films with high shrink responses, wide orientation windows, high modulus and high softening temperatures (i.e., shrink films with balanced properties) are unknown in the prior art. That is, polymer designers invariably have to sacrifice high softening temperatures and high modulus to provide films with high shrink responses and wide orientation windows. The importance of higher modulus pertains to, for example, the need for good machinability during automatic packaging operations and good handling during bag making operations.

An example of teaching that's beyond ordinary rules of thumb (but is nevertheless fairly generalized) is provided by Golike in U.S. Pat. No. 4,597,920. Golike teaches orientation should be carried out at temperatures between the lower and higher melting points of a copolymer of ethylene with at least one $C_8$–$C_{18}$ α-olefin. Golike specifically teaches that the temperature differential is at least 10° C., however, Golike also specifically discloses that the full range of the temperature differential may not be practical because, depending on the particular equipment and technique used, tearing of the polymer film may occur at the lower end of the range. At the higher limit of the range, Golike teaches the structural integrity of the polymer film begins to suffer during stretching (and ultimately fails at higher temperatures) because the polymer film then is in a soft, molten condition. See, U.S. Pat. No. 4,597,920, Col. 4, lines 52–68 bridging to Col. 5., lines 1–6. The orientation temperature range defined by Golike (which is based on higher and lower peak melting points) generally applies to polymer blends and heterogeneously branched ethylene/α-olefin interpolymers, i.e., compositions having two or more DSC melting points, and generally does not apply to homogeneously branched ethylene/α-olefin interpolymers which have only a single DSC melting point. Golike also indicates that a person of ordinary skill can determine the tear temperature of a particular polymer and discloses that for heterogeneously branched interpolymers having a density of about 0.920 g/cc, the tear temperature occurs at a temperature above the lower peak melting point. See, U.S. Pat. No. 4,597,920, Col. 7, Example 4. However, Golike does not teach or suggest how to optimize the orientation process as to stretching temperature at a given stretching rate and ratio to maximize the shrink response and achieve balanced properties.

Hideo et al. in EP 0359907 A2 teach the film surface temperature at the starting point of stretching should be within the range of from 20° C. to about 30° C. below the melting temperature of the polymer as determined in regards to the main DSC endothermic peak. While such teaching is considered applicable to homogeneously branched ethylene/α-olefin interpolymers having a single DSC melting peak, the prescribed range is fairly general and broad. Moreover, Hideo et al. do not provide any specific teaching as to the optimum orientation temperature for a particular interpolymer respecting heat shrink response, nor for any other desired shrink film property.

WO 95/08441 provides generalized teachings pertaining to homogeneously branched ethylene/α-olefin interpolymers. In the Examples of this disclosure, several different homogeneously branched substantially linear ethylene/α-olefin interpolymers were studied and compared to one heterogeneously branched ethylene/α-olefin interpolymers. Although the homogeneously branched substantially linear ethylene/α-olefin interpolymers had densities that varied from 0.896 to 0.906 g/cc, all of the interpolymers (including the heterogeneously branched linear ethylene/α-olefin interpolymer, ATTANE™ 4203, supplied by The Dow Chemical Company, which had a density of 0.905 g/cc) were oriented at essentially the same orientation temperature. Reported results in WO 95/08441 disclose three general findings: (1) at an equivalent polymer density, substantially linear ethylene/α-olefin interpolymers and heterogeneously branched linear ethylene/α-olefin interpolymers have essentially equivalent shrink responses (compare Example 21 and Example 39 at pages 15–16), (2) shrink responses increase at lower densities and constant orientation temperatures, and (3) as orientation temperature increases, orientation rates increase. Furthermore, careful study of the Examples and unreported DSC melting point data for the interpolymers reported on in WO 95/08441 indicate for the Examples disclosed in WO 95/08441 that, at a given stretching rate and ratio, there is a preference for orienting multilayer film structures at orientation temperatures above the respective DSC melting point of the polymer employed as the shrink control layer. Moreover, none of the teachings or Examples in WO 95/08441 suggest a shrink film with balanced properties is obtainable.

Other disclosures that set forth orientation information regarding homogeneously branched ethylene polymers (yet do not specify orientation conditions relative to the lowest stretch temperatures, nor teach the specific requirements for balanced shrink film properties) include EP 0 600425A1 to Babrowicz et al. and EP 0 587502 A2 to Babrowicz et al.

Although several film compositions have been disclosed in the art as being useful for both hot-blown shrink film and oriented shrink film applications, these disclosures focus on providing films with a high shrink response when prepared by either method. However, in addition to a high shrink response, shrink film must also possess a number of important properties such as, for example, relatively high softening points and improved modulus that are particularly suitable for use in hot-fill applications. Moreover, for many applications, including hot-fill packaging and shrink packaging of sharp items such as, for example, hardware goods and primal meat cuts, shrink films must also possess good abuse or toughness properties. While the art is replete with various alleged solutions that meet the particular performance requirements of shrink film applications, no known shrink film provides the desired balance of high shrink response and improved toughness.

Accordingly, although there are general rules and general disclosures pertaining to shrink film and suitable orientation temperatures for biaxially orienting polyolefins, there is no specific information as to optimum orientation conditions as a function of polymer type and, more importantly, there is no specific information as to balanced or optimized shrink responses, wide orientation windows, high modulus and high softening temperatures. As such, it is an object of the present invention to provide an improved shrink film with a maximized shrink response, an increased orientation window and, for a given modulus or polymer density, a relatively high softening temperature. It is also an object of the present invention to provide a shrink film with a high shrink response and improved toughness. Another object of the invention is to provide a method of making an oriented shrink film having balanced heat-shrink and toughness properties. Another object of the invention is to provide a method of making an oriented shrink film having balanced heat-shrink and toughness properties wherein the method includes an elaborate biaxial orientation technique. These and other objects will become apparent from the detailed description and various the embodiments that follow.

SUMMARY OF THE INVENTION

In accordance with the present invention, we have discovered that for a polymer composition comprised of at least two ethylene polymers, wherein the density differential between the two ethylene polymer components is selectively controlled and optimized, a substantially improved shrink film is obtained. The improved shrink film will have balanced properties, i.e., a high shrink response, a wide orientation window and a relatively high softening temperature. We have also discovered that where the polymer composition is further defined as comprising a higher density second ethylene polymer component which is characterized as having a molecular weight equal to or greater than the lower density first ethylene polymer component, the shrink film will be characterized as having a high shrink response and improved film toughness.

The broad aspect of the present invention is a shrink film comprising a polymer composition, the polymer composition characterized as having a density in the range of 0.88 gram/centimeter (g/cc) to 0.94 g/cc, as determined in accordance with ASTM D-792, and as comprising and made from from to 80 weight percent, based on the total weight of the polymer composition, of at least one first ethylene polymer characterized as having
  (i) a one or more melting peak, as determined using differential scanning calorimetry (DSC), and
  (ii) a density in the range of 0.87 (g/cc) to 0.93 g/cc, as determined in accordance with ASTM D-792, and
from 20 to 80 weight percent, based on the total weight of the polymer composition, of at least one second ethylene polymer characterized as having
  (i) one or more melting peaks, as determined using differential scanning calorimetry (DSC), and
  (ii) a density in the range of 0.89 (g/cc) to 0.96 g/cc, as determined in accordance with ASTM D-792,
wherein the density differential between the first and second ethylene polymer components, determined in accordance with ASTM D-792, is in the range of from 0 to 0.05 g/cc.

A second aspect of the present invention is a shrink film comprising a polymer composition, the polymer composition having a density in the range of 0.88 gram/centimeter (g/cc) to 0.94 g/cc, as determined in accordance with ASTM D-792, and comprising and made from
  (A) from 20 to 80 weight percent, based on the total weight of the polymer composition, of at least one first ethylene polymer characterized as having
    (i) a single melting peak, as determined using differential scanning calorimetry (DSC), or a single Analytical Temperature Rising Elution Fractionation (ATREF) peak, and
    (ii) a density in the range of 0.87 (g/cc) to 0.93 g/cc, as determined in accordance with ASTM D-792, and
  (B) from 20 to 80 weight percent, based on the total weight of the polymer composition, of at least one second ethylene polymer characterized as having
    (i) one or more melting peaks, as determined using differential scanning calorimetry (DSC), and
    (ii) a density in the range of 0.89 (g/cc) to 0.96 g/cc, as determined in accordance with ASTM D-792,
wherein the density differential between the first ethylene polymer component (A) and the second ethylene polymer component (B), determined in accordance with ASTM D-792, is in the range of from 0 to 0.03 g/cc.

A third aspect of the present invention is a shrink film comprising a polymer composition, the polymer composition having a density in the range of from 0.88 gram/centimeter (g/cc) to 0.94 g/cc, and comprising and made from
  (C) from 20 to 80 weight percent, based on the total weight of the polymer composition, of at least one first ethylene polymer, wherein the at least one first ethylene polymer is manufactured using a single site metallocene or constrained geometry catalyst system and is characterized as having:
    (i) one or more melting peaks, as determined using differential scanning calorimetry (DSC),
    (ii) a short chain branching index (SCBDI) or composition distribution branching index (CDBI) greater than 50 percent, as determined using temperature rising elution fractionation,
    (iii) a molecular weight, as indicated by a melt index value determined in accordance with ASTM D-1238, and
    (iv) a density in the range of from 0.87 (g/cc) to 0.93 g/cc, and
  (D) from 20 to 80 weight percent, based on the total weight of the polymer composition, of at least one second ethylene polymer characterized as having:
    (i) one or more melting peaks, as determined using differential scanning calorimetry (DSC),
    (ii) a molecular weight equal to or greater than the molecular weight of the first ethylene polymer (C), as indicated by melt index values determined in accordance with ASTM B-1238, and
    (iii) a density in the range of from 0.89 (g/cc) to 0.96 g/cc,
wherein the density differential between the first and second ethylene polymer components (C) and (D) is in the range of from 0.001 to 0.05 g/cc, the density of the at least one first ethylene polymer (C) is lower than the density of the least one second ethylene polymer (D), and wherein the density for polymer components (C) and (D) and for the polymer composition is determined in accordance with ASTM D-792.

Unexpectedly, the present inventive shrink film shows an improved shrink response at a comparatively higher density while typically lower densities are required for such improvement. As another unexpected surprise, the inventive shrink film also shows a comparatively high softening temperature for its given shrink response where typically for ethylene alpha-olefin interpolymer softening temperatures are reduced where the shrink response is improved. Specifically, the inventive shrink film exhibits surprisingly higher shrinkage at equivalent or higher softening temperature whereas for prior art materials, softening temperatures must be decreased for higher shrinkage performance.

As another unexpected result, the present inventive oriented shrink film shows improved toughness when biaxially oriented using an elaborate orientation process (e.g., tenter framing or double bubble orientation) relative to comparative films made from similar polymer compositions. That is, the present invention is surprising in that the inventive film has superior oriented shrink film toughness relative a comparative film where the same comparative film shows excellent hot-blown shrink film toughness. In this comparison, the comparative film comprises (1) a first ethylene polymer component equivalent to the inventive film and (2) a second ethylene polymer component that differs from both the second polymer component of the inventive film and its first ethylene polymer component. The second ethylene polymer component of the comparative film differs from the first ethylene polymer component of the comparative film by having a lower molecular weight and higher density.

The toughness performance of the inventive film is also surprising in that it can have a level of shrink film toughness that is ordinarily obtainable with heterogeneously branched linear ethylene/α-olefin interpolymers such as, for example DOWLEX™ LLDPE resins available from The Dow Chemical Company. The excellent toughness of the inventive film in comparison to heterogeneously branched linear ethylene/α-olefin interpolymers is considered to be particularly surprising where the at least one first ethylene polymer is a substantially linear ethylene polymer. That is, the excellent impact or toughness properties of the present invention (as well as for the invention disclosed by Lai et al. in U.S. Pat. Nos. 5,272,236 and 5,278,272) is contrary to various teachings in the art (see, for example, "Enhanced Metallocene PE Terpolymers are Unveiled," *Modern Plastics*, July 1994, pp. 33–34) which suggest inferior toughness-properties should be expected where long chain branched polymers are employed.

While the present invention allows practitioners to realize increased unrestrained shrink performance, the benefits of this invention are particularly useful for those common commercial instances where the orientation temperature capabilities of the stretching operation are essentially fixed. That is, by providing an increased orientation window, a film composition that could not be successfully stretched at all within a given equipment capability can now be conveniently oriented. Moreover, because of the discovery of excellent oriented shrink film toughness, we believe one of the benefits of the present invention is practitioners can now use the same film composition to prepare either an oriented shrink film or a hot-blown shrink film and realize excellent abuse or toughness properties in both instances.

BRIEF DESCRIPTION OF DRAWINGS

FIG. 3 is a plot of the shrink response at 90° C. in water and 105° C. in hot oil versus polymer composition density for Examples 10–12 and comparative examples 13 and 14.

FIG. 4 is a plot of the 1 percent secant modulus (in psi) versus polymer composition density (in grams/cubic centimeter) for Examples 10–12 comparative examples 13–18.

DETAILED DESCRIPTION OF THE INVENTION

Figure 1:
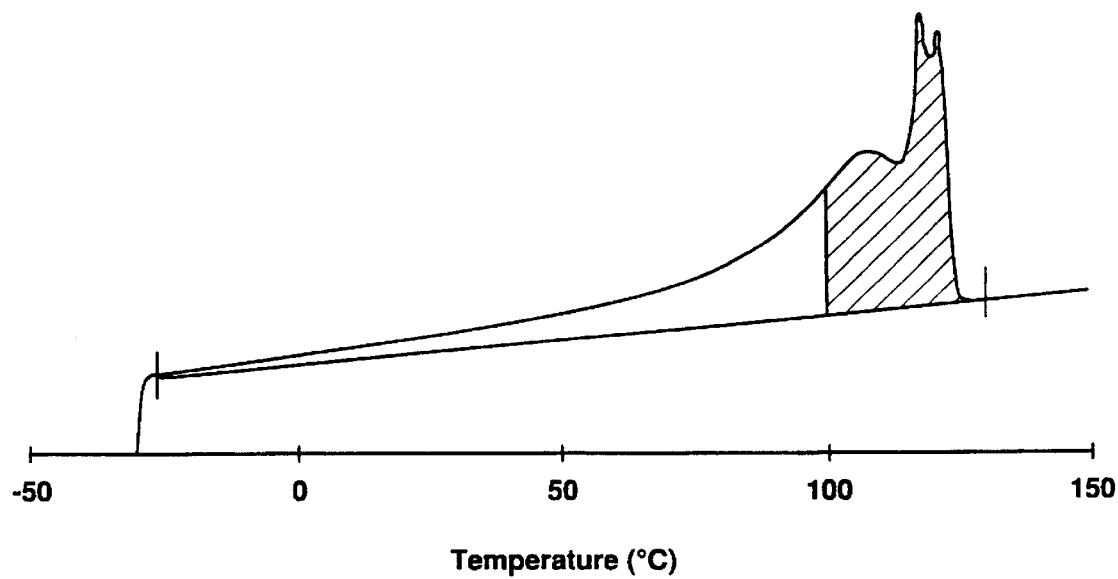
FIG. 1 is a first heat DSC curve illustrating the residual crystallinity portion of a heterogeneously branched polymer remaining at 100° C. which is a temperature below the various melting peaks of the polymer illustrated.

The term "polymer" as used herein refers to a polymeric compound prepared by polymerizing monomers, whether of the same or a different type. The term "polymer" is used generically herein to embrace the terms "homopolymer," "copolymer," "terpolymer" and "interpolymer."

The term "interpolymer" as used herein refers to polymers prepared by the polymerization of at least two different types of monomers. The generic term "interpolymer" thus includes the term "copolymers" (which is usually employed to refer to polymers prepared from two different monomers) as well as the term "terpolymers" (which is usually employed to refer to polymers prepared from three different types of monomers, e.g., an ethylene/butene/hexene polymer). "Stretched" and "oriented" are used in the art and herein interchangeably, although orientation is actually the consequence of a film being stretched by, for example, internal air pressure pushing on the tube or by a tenter frame pulling on the edges of the film.

The term "lowest stretch temperature" as used herein means the temperature below which the film either tears and/or stretches unevenly for a given stretching rate and stretching (draw) ratio during the stretching operation or step of an orientation technique. The lowest stretch temperature is (1) below the melting point of the film, (2) a temperature below which the film can not be uniformly stretched (i.e., without the occurrence of banding or necking or the sample dislodging from the grips of the stretcher at grip pressures of approximately 500 psi (3.5 MPa)), and (3) a temperature below which the film tears for a particular stretching rate and stretch ratio.

Practitioners will appreciate that to maximize the stretch imparted and therefore the shrink response, the objective is to operate as close to the lowest stretch temperature as their equipment and capabilities will allow whether or not significant stretching or orientation is accomplished in a single step or by a combination of sequential steps.

Additionally, practitioners will appreciate that the optimum or near-optimum stretching temperature for maximized shrink response at a given shrink temperature will interrelate with the stretching rate and ratio. That is, while a particular stretching temperature will be optimum or near-optimum at one combination of stretching rate and stretching ratio, the same stretching temperature will not be optimum or near-optimum at a different combination of stretching rate and stretching ratio.

Practitioners will also appreciate that to obtain the maximum shrink response from the orientation frozen into the film, the shrink temperature should match or exceed the stretching temperature. That is, reduced shrink temperatures do not allow full relaxation or shrinkage of the film. However, excessive shrink temperatures can diminish film integrity.

Practitioners will further appreciate that for a given combination of stretching temperature, stretching rate and stretching ratio, increases in the shrink temperature to a temperature immediately below the temperature film integrity failure yields higher shrink responses and higher levels of shrink tension.

Shrink temperatures in the range of from 70 to 140° C., especially from 80 to 125° C., and more especially from 85 to 110° C. are suitable in the present invention.

The term "residual crystallinity" is used herein to refer the crystallinity of a polymer film at a particular stretching temperature. Residual crystallinity is determined using a Perkin-Elmer DSC 7 set for a first heat at 10° C./min. of a water-quenched, compression molded film sample of the polymer. The residual crystallinity for a polymer at a particular temperature is determined by measuring heat of fusion between that temperature and the temperature of complete melting using a partial area technique and by dividing the heat of fusion by 292 Joules/ gram. The heat of fusion is determined by computer integration of the partial area using Perkin-Elmer PC Series Software Version 3.1. An example of the residual crystallinity determination and calculation is shown in FIG. 1.

The term "shrink control layer" is used herein to refer to the film layer that provides or controls the shrink response. Such a layer is inherent to all heat shrink films. In a monolayer heat shrink film, the shrink control layer will be the film itself. In a multilayer heat shrink film, the shrink control layer is typically the core or an inside film layer and is typically the thickest film layer. See, for example, WO 95/08441.

Figure 2:
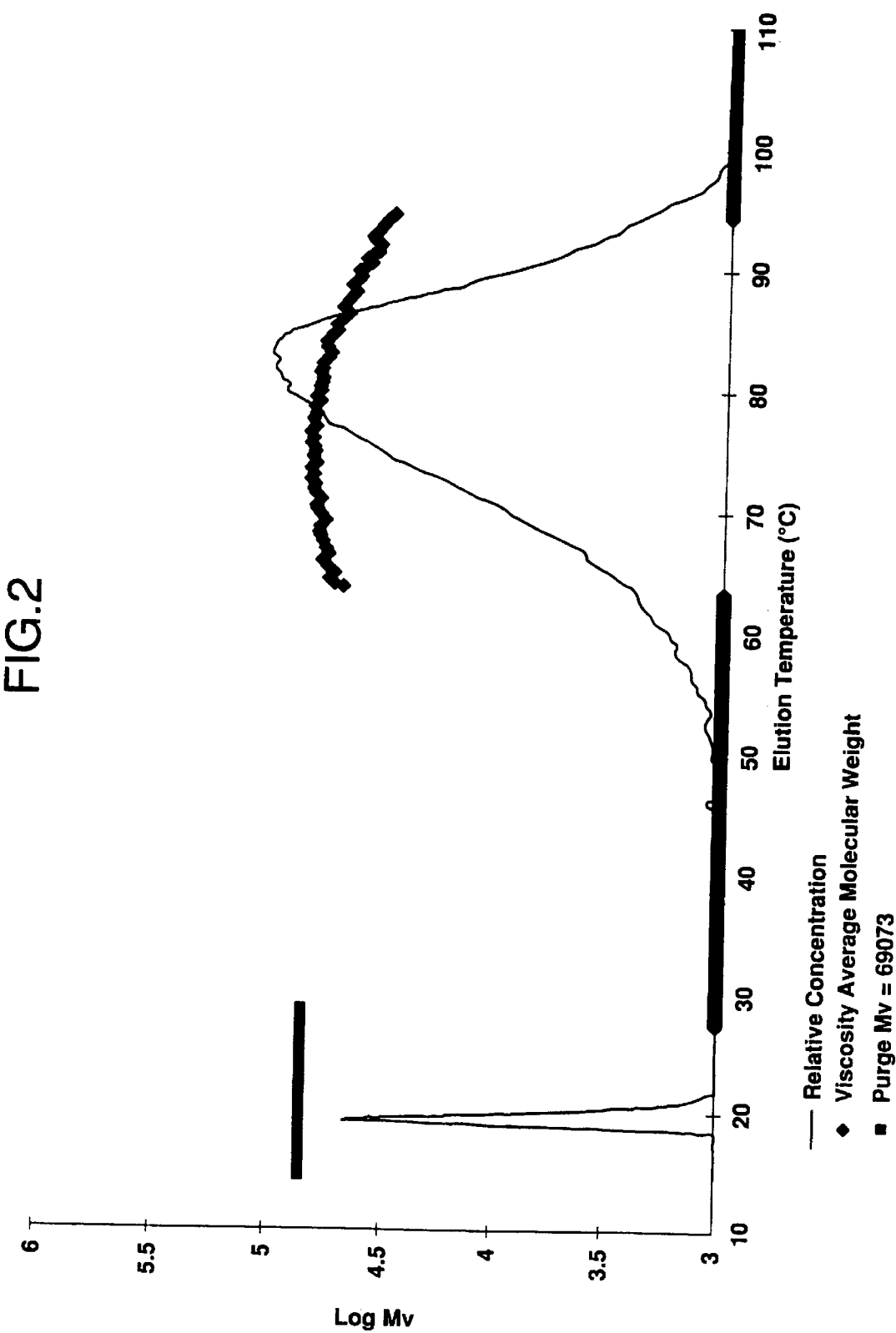
FIG. 2 is an Analytical Temperature Rising Elution Fractionation (ATREF) curve of EXCEED™ ECD 301 resin (3 g/10 min. $I_2$, 0.917 g/cc density) supplied by Exxon Chemical Company having a single ATREF peak.

The term "substantially unoriented form" is used herein in reference the fact that some amount of orientation is usually imparted to a film during ordinary fabrication. As such, it is meant that the fabrication step, in itself, is not used to impart the degree of orientation required for the desired or required shrink response. The present invention is thought to be generally applicable to operations where the fabrication and orientation steps are separable (e.g., tenter framing) as well as to operations where fabrication and orientation occur simultaneously or sequentially as part of the operation itself (e.g., a double bubble technique). By "a single ATREF peak" it is meant that the purge portion or non-crystallizable polymer fraction observed in a typical ATREF curve is not considered to be an ATREF peak. For example, in FIG. 2, the elution at the elution temperature of about 20° C. is a purge portion and not an ATREF peak. As such, the polymer is characterized as having a single ATREF peak which peaks at an elution temperature lo of about 57.5° C. Temperature rising elution fractionation (TREF) techniques such as that described, for example, by Wild et al. can be used to "fingerprint" or identify the inventive polymer composition and oriented shrink film.

By "independently characterized" it is meant that the ASTM D-1238 melt index of the polymer components need not be the same, although they can be the same.

The term "linear" as used to describe ethylene polymers is used herein the same as in the conventional sense to mean the polymer backbone of the ethylene polymer lacks measurable or demonstrable long chain branches, i.e., the polymer is characterized as having less than 0.01 long branch/ 1000 carbons.

The term "homogeneous ethylene polymer" as used to describe ethylene polymers is used in the conventional sense in accordance with the original disclosure by Elston in U.S. Pat. No. 3,645,992, the disclosure of which is incorporated herein by reference. The term "homogeneous ethylene polymer" refers to an ethylene polymer in which the comonomer is randomly distributed within a given polymer molecule and wherein substantially all of the polymer molecules have substantially the same ethylene to comonomer molar ratio. As defined herein, both substantially linear ethylene polymers and homogeneously branched linear ethylene are homogeneous ethylene polymers.

Homogeneously branched ethylene polymers are homogeneous ethylene polymers that possess short chain branches and that are characterized by a relatively high short chain branching distribution index (SCBDI) or relatively high composition distribution branching index (CDBI). That is, the ethylene polymer has a CDBI greater than or equal to 50 percent, preferably greater than or equal to 70 percent, more preferably greater than or equal to 90 percent. Also, the ethylene polymer is typically characterized as having a measurable high density polymer fraction (i.e., a crystalline polymer fraction having no short chain branching or zero methyls/1000 carbons in the range of from 86° C. to 98° C. as determined by ATREF) in the range of from 0 to 0.5 weight percent, based on the total weight of the whole polymer, and preferably, no measurable high density fraction.

The CDBI is defined as the weight percent of the polymer molecules having a comonomer content within 50 percent of the median total molar comonomer content and represents a comparison of the comonomer distribution in the polymer to the comonomer distribution expected for a Bernoullian distribution. The CDBI of polyolefins can be conveniently calculated from data obtained from techniques known in the art, such as, for example, temperature rising elution fractionation (abbreviated herein as "TREF") as described, for example, by Wild et al., *Journal of Polymer Science, Poly. Phys. Ed.*, Vol. 20, p. 441 (1982), L. D. Cady, "The Role of Comonomer Type and Distribution in LLDPE Product Performance," SPE Regional Technical Conference, Quaker Square Hilton, Akron, Ohio, Oct. 1–2, pp. 107–119 (1985), or in U.S. Pat. Nos. 4,798,081; 5,008,204; and 5,322,728; the disclosures of all of which are incorporated herein by reference. However, the preferred TREF technique does not include purge quantities in the CDBI calculations. More preferably, the comonomer distribution of the polymer and CDBI are determined using $^{13}$C NMR analysis in accordance with techniques described, for example, in U.S. Pat. No. 5,292,845 and by J. C. Randall in Rev. Macromol. Chem. Phys., C29, pp. 201–317.

The terms "homogeneously branched linear ethylene polymer" and "homogeneously branched linear ethylene/α-olefin polymer" means that the olefin polymer has a homogeneous or narrow short branching distribution (i.e., the polymer has a relatively high CDBI) but does not have long chain branching. That is, the linear ethylene polymer is a homogeneous ethylene polymer characterized by an absence of long chain branching. Homogeneously branched linear ethylene polymers can be made using polymerization processes (e.g., as described by Elston in U.S. Pat. No. 3,645, 992) which provide a uniform short chain branching distribution (i.e., homogeneously branched). In his polymerization process, Elston uses soluble vanadium catalyst systems to make such polymers, however others, such as Mitsui Petrochemical Industries and Exxon Chemical Company, have reportedly used so-called single site catalyst systems to make polymers having a homogeneous structure similar to polymer described by Elston. U.S. Pat. No. 4,937,299 to Ewen et al. and U.S. Pat. No. 5,218,071 to Tsutsui et al. disclose the use of metallocene catalysts, such as catalyst systems based on hafnium, for the preparation of homogeneously branched linear ethylene polymers. Homogeneously branched linear ethylene polymers are typically characterized as having a molecular weight distribution, $M_w/M_n$, of approximately 2.

The terms "homogeneous linearly branched ethylene polymer" or "homogeneously branched linear ethylene/α-olefin polymer" do not refer to high pressure branched polyethylene which is known to those skilled in the art to have numerous long chain branches. A homogeneously branched linear ethylene/α-olefin interpolymer possesses short chain branching and the α-olefin is typically at least one $C_3$–$C_{20}$ α-olefin (e.g., propylene, 1-butene, 1-pentene, 4-methyl-1-pentene, 1-hexene, and 1-octene).

When used herein in reference to an ethylene homopolymer (i.e., a high density ethylene polymer not containing any comonomer and thus having no short chain branches), the term "homogeneous ethylene polymer" or "homogeneous linear ethylene polymer" means the polymer was made using a so-called homogeneous catalyst system such as, for example, the system described by Elston or Ewen or described by Canich in U.S. Pat. Nos. 5,026,798 and 5,055,438, or by Stevens et al. in U.S. Pat. No. 5,064,802.

The term "substantially linear ethylene polymer" is used herein to refer specially to homogeneously branched ethylene polymers that have long chain branching. The term does not refer to heterogeneously or homogeneously branched ethylene polymers that have a linear polymer backbone.

For substantially linear ethylene polymers, the long chain branches have the same comonomer distribution as the polymer backbone, and the long chain branches can be as long as about the same length as the length of the polymer backbone to which they are attached. The substantially linear ethylene polymers used in the present invention have from 0.01 long chain branches/1000 carbons to 3 long chain branches/1000 carbons, more preferably from 0.01 long chain branches/1000 carbons to about 1 long chain branches/1000 carbons, and especially from 0.05 long chain branches/1000 carbons to 1 long chain branches/1000 carbons.

Long chain branching is defined herein as a chain length of at least 6 carbons, above which the length cannot be distinguished using $^{13}C$ nuclear magnetic resonance spectroscopy. Long chain branches are obviously of greater length than of short chain branches resulting from comonomer incorporation.

The presence of long chain branching can- be determined in ethylene homopolymers by using $^{13}C$ nuclear magnetic resonance (NMR) spectroscopy and is quantified using the method described by Randall (Rev. Macromol. Chem. Phys., C29, V. 2&3, p. 285–297), the disclosure of which is incorporated herein by reference.

Although conventional $^{13}C$ nuclear magnetic resonance spectroscopy cannot determine the length of a long chain branch in excess of six carbon atoms, there are other known techniques useful for determining the presence of long chain branches in ethylene polymers, including ethylene/l-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., J. Chem. Phys., 17, 1301 (1949) and Rudin, A., *Modern Methods of Polymer Characterization*, John Wiley & Sons, New York (1991) pp. 103–112.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is a useful technique for quantifying the presence of long chain branches in substantially linear ethylene polymers. In particular, deGroot and Chum found that the level of long chain branches in substantially linear ethylene homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

DeGroot and Chum also showed that a plot of Log($I_2$, melt index) as a function of Log(GPC Weight Average Molecular Weight) as determined by GPC-DV illustrates that the long chain branching aspects (but not the extent of long branching) of substantially linear ethylene polymers are comparable to that of high pressure, highly branched low density polyethylene (LDPE) and are clearly distinct from ethylene polymers produced using Ziegler-type catalysts such as titanium complexes and ordinary homogeneous catalysts such as hafnium and vanadium complexes.

For substantially linear ethylene polymers, the long chain branch is longer than the short chain branch that results from the incorporation of the α-olefin(s) into the polymer backbone. The empirical effect of the presence of long chain branching in the substantially linear ethylene polymers used in the invention is manifested as improved rheological properties. The improved Theological properties of substantially linear ethylene polymers can be quantified and expressed herein in terms of gas extrusion rheometry (GER) results and/or melt flow, $I_{10}/I_2$, increases.

Substantially linear ethylene polymers are homogeneously branched ethylene polymers and are disclosed in U.S. Pat. Nos. 5,272,236 and 5,278,272. Homogeneously branched substantially linear ethylene polymers can be prepared via the continuous solution, slurry, or gas phase polymerization of ethylene and at least one optional α-olefin comonomer in the presence of a constrained geometry catalyst, such as the method disclosed in European Patent Application 416,815-A, which is incorporated herein by reference. The polymerization can generally be performed in any reactor system known in the art including, but not limited to, a tank reactor(s), a sphere reactor(s), a recycling loop reactor(s) or combinations thereof and the like, any reactor or all reactors operated partially or completely adiabatically, nonadiabatically or a combination of both and the like. Preferably, a continuous solution polymerization process is used to manufacture the substantially linear ethylene polymer used in the present invention.

The terms "heterogeneous" and "heterogeneously branched" mean that the ethylene polymer is characterized as a mixture of interpolymer molecules having various ethylene to comonomer molar ratios. As used herein, the terms "heterogeneous" and "heterogeneously branched" pertain to a single component polymer or a component polymer of a polymer composition and, as such, the terms "heterogeneous" and "heterogeneously branched" are not meaningful in regards to a polymer composition comprised of multiple component polymers.

Heterogeneously branched ethylene polymers are characterized as having a short chain branching distribution index (SCBDI) or composition distribution branching index CDBI of less than 50 percent. Heterogeneously branched ethylene polymers are typically characterized as having molecular weight distributions, $M_w/M_n$, in the range of from 3.5 to 4.1 and, as such, are distinct from substantially linear ethylene polymers and homogeneously branched linear ethylene polymers in regards to both compositional short chain branching distribution and molecular weight distribution.

For the broad aspect of the present invention, i.e., pertaining to both providing balanced properties and improved toughness, the density differential between the at least two ethylene polymer components is generally in the range from 0 to 0.05 g/cc, preferably, from 0 to 0.02 g/cc, and more preferably from 0 to 0.015 g/cc, as measured in accordance with ASTM D-792. Also, for the broad aspect of the present invention, preferably the at least one first ethylene polymer component is a homogeneously branched ethylene polymer and most preferably a substantially linear ethylene/α-olefin interpolymer and the at least one second ethylene polymer component is a heterogeneously branched ethylene polymer and most preferably a heterogeneously branched ethylene/α-olefin interpolymer.

For the aspect of the invention that provides balanced properties, the density differential between the at least one first ethylene polymer component (A) and the at least one second ethylene polymer component (B) is generally in the range of from 0 to 0.03 g/cc, preferably in the range of from 0.01 to 0.03 g/cc, more preferably in the range of from 0.015 to 0.025 g/cc, as measured in accordance with ASTM D-792.

A percent DSC crystallinity may also be used to characterize the at least one first ethylene polymer component (A) and the at least one second ethylene polymer component (B). That is, the percent DSC crystallinity differential between the at least one first ethylene polymer component (A) and the at least one second ethylene polymer component (B) is generally in the range of from 0 to 23%, preferably in the range of from 7 to 20%, more preferably in the range of from 10 to 18%.

The first ethylene polymer component (A) has a density in the range of from 0.87 to 0.93 g/cc, preferably from 0.88 to 0.92 g/cc (as measured in accordance with ASTM D-792). The second ethylene polymer component (B) has a density in the range of from 0.89 to 0.96 g/cc, preferably from 0.90 to 0.94 g/cc (as measured in accordance with ASTM D-792). Additionally, it is preferred that the density of the at least one first ethylene polymer component (A) is lower than the density of the at least one second ethylene polymer component (B).

The overall density of the polymer mixture (i.e., the combination of component (A) and component (B) is generally in the range of from 0.88 to 0.94 g/cc, preferably in the range of from 0.89 to 0.93 g/cc, more preferably in the range of from 0.90 to 0.93 g/cc, and most preferably in the range of from 0.90 to 0.92 g/cc (as measured in accordance with ASTM D-792).

The first ethylene polymer component of the polymer composition used in the invention, Component (A), is at least one ethylene polymer having a single DSC melting peak or, alternatively, a single ATREF peak.

The second component polymer (B) of the polymer composition is at least one ethylene polymer having one or more DSC melting peaks. Suitable polymers for use as the at least one second ethylene polymer include heterogeneously branched linear low density polyethylene (e.g., linear low density polyethylene and ultra or very low density polyethylene), substantially linear ethylene polymers, homogeneously branched linear ethylene polymers, high pressure ethylene polymers (e.g., low density polyethylene, ethylene vinyl acetate (EVA) copolymer, ethylene acrylic acid (EAA) copolymer or ethylene methacrylic acid (EMAA) ionomer) and combinations or mixtures thereof.

However, preferably the first ethylene polymer component (A) is at least one substantially linear ethylene polymer and the second component polymer (B) is a heterogeneously branched linear ethylene polymer. Substantially linear ethylene polymers are preferred as the first ethylene polymer component (A) due to their improved melt extrusion processability and unique rheological properties as described by Lai et. al in U.S. Pat. Nos. 5,272,236 and 5,278,272.

The molecular weight of polyolefin polymers is conveniently indicated using a melt index measurement according to ASTM D-1238, Condition 190° C./2.16 kg (formerly known as "Condition E" and also known as $I_2$). Melt index is inversely proportional to the molecular weight of the polymer. Thus, the higher the molecular weight, the lower the melt index, although the relationship is not linear. Component (A) and component (B) will be independently characterized by an $I_2$ melt index and preferably the at least one first ethylene polymer (A) will have a higher molecular weight (or lower $I_2$) than the at least one second ethylene polymer (B). By "independently characterized" as used in reference to polymer components (A) and (B), it is meant that the $I_2$ melt index of polymer component (A) is not necessarily the same as the $I_2$ melt index of polymer component (B), although it can be.

The first ethylene polymer component (A) has an $I_2$ melt index in the range of from greater than or equal to 0.01 g/10 minutes to less than or equal to 50 g/10 minutes, preferably from greater than or equal to 0.05 g/10 minutes to less than or equal to 20 g/10 minutes, most preferably from greater than or equal to 0.5 g/10 minutes to less than or equal to 10 g/10 minutes.

The second ethylene polymer component (B) may have an $I_2$ melt index in the range of from 0.01 g/10 minutes to 100 g/10 minutes, preferably from 0.05 g/10 minutes to 50 g/10 minutes, more preferably from 0.1 g/10 minutes to 20 g/10 minutes, and most preferably from 0.5 g/10 minutes to 10 g/10 minutes.

The overall melt index of the polymer composition based on polymer components (A) and (B) is preferably in the range of from 0.1 to 5 g/10 minutes, more preferably from 0.5 to 4 g/10 minutes.

Other measurements useful in characterizing the molecular weight of substantially linear ethylen interpolymers and homopolymers involve melt index determinations with higher weights, such as, for common example, ASTM D-1238, Condition 190° C./10 kg (formerly known as "Condition N" and also known as $I_{10}$). The ratio of a higher weight melt index determination to a lower weight determination is known as a melt flow ratio, and for measured $I_{10}$ and the $I_2$ melt index values the melt flow ratio is conveniently designated as $I_{10}/I_2$. For the substantially linear ethylene polymers used to prepare the films of the present invention, the melt flow ratio indicates the degree of long chain branching, i.e., the higher the $I_{10}/I_2$ melt flow ratio, the more long chain branching in the polymer. In addition to being indicative of more long chain branching, higher $I_{10}/I_2$ ratios are also indicative of lower viscosity at higher shear rates (easier processing) and higher extensional viscosity.

In general, the at least one first ethylene polymer component (A) has an $I_{10}/I_2$ melt flow ratio greater than 6, preferably from greater than 7, more preferably greater than 8, and most preferably in the range of from 8.5 to 20. Embodiments that meet the specified density differential and have an $I_{10}/I_2$ melt flow ratio greater than 8 are particularly preferred embodiments of the present invention. Embodiments that meet the specified density differential and have an $I_{10}/I_2$ melt flow ratio greater than 8 are a particularly preferred embodiment of the present invention.

The first ethylene polymer component (A) generally constitutes from 20 to 80 weight percent of the polymer composition, based on the total weight of the polymer composition and preferably from 30 to 70 weight percent of the polymer composition, based on the total weight of the polymer composition. Conversely, the polymer composition used in the present invention comprises from 20 to 80 weight percent and preferably from 30 to 70 weight percent of the at least one second ethylene polymer component (B), based on the total weight of the polymer composition.

Suitable ethylene polymers for use as the second component polymer (B) include substantially linear ethylene interpolymers, homogeneously branched linear ethylene interpolymers, heterogeneously branched linear ethylene interpolymers (e.g., linear low density polyethylene (LLDPE), medium density polyethylene (MDPE), high density polyethylene (HDPE) and ultra low or very low density polyethylene (ULDPE or VLDPE)), and combinations or mixtures thereof.

For the aspect of the invention that provides improved toughness, the at least one second polymer component (D) has density higher than the at least one first polymer component (C). The density differential between the at least one first ethylene polymer component (C) and the at least one second ethylene polymer component (D) is generally in the range of from 0.001 to 0.05 g/cc, preferably in the range of from 0.01 to 0.05 g/cc, more preferably in the range of from 0.01 to 0.03 g/cc, as measured in accordance with ASTM D-792.

Like the aspect described above, a percent DSC crystallinity may also be used to characterize the at least one first ethylene polymer component (C) and the at least one second ethylene polymer component (D). That is, the percent DSC crystallinity differential between the at least one first ethylene polymer component (C) and the at least one second ethylene polymer component (D) is generally in the range of from 1 to 23%, preferably in the range of from 7 to 20%, more preferably in the range of from 10 to 18%.

The first ethylene polymer component (C) has a density in the range of from 0.87 to 0.93 g/cc, preferably from 0.88 to 0.92 g/cc (as measured in accordance with ASTM D-792). The second ethylene polymer component (D) has a density in the range of from 0.89 to 0.96 g/cc, preferably from 0.90 to 0.94 g/cc (as measured in accordance with ASTM D-792). Additionally, the density of the at least one first ethylene polymer component (C) is lower than the density of the at least one second ethylene polymer component (D).

The density of the inventive polymer composition (i.e., the combination of component (C) and component (D)) is generally in the range of from 0.88 to 0.94 g/cc, preferably in the range of from 0.89 to 0.93 g/cc, more preferably in the range of from 0.90 to 0.93 g/cc, and most preferably in the range of from 0.90 to 0.92 g/cc (as measured in accordance with ASTM D-792).

The first ethylene polymer component of the inventive polymer composition, Component (C), is at least one ethylene polymer having one or more DSC melting peak. However, preferably, the at least one first ethylene polymer will have a single DSC melting peak or a single ATREF peak, and more preferably, the least one first ethylene polymer (C) will have both a single DSC melting peak and a single ATREF peak. The second component polymer of the polymer composition is at least one ethylene polymer having one or more DSC melting peaks.

Polymer component (C) and polymer component (D) will be independently characterized by an ASTM D-1238 melt index with the at least one second ethylene polymer (D) having a molecular weight equal to or greater than the at least one first ethylene polymer (C).

The first ethylene polymer component (C) can have an $I_2$ melt index in the range of from greater than or equal to 0.01 g/10 minutes to less than or equal to 100 g/10 minutes, preferably from greater than or equal to 0.05 g/10 minutes to less than or equal to 50 g/10 minutes, more preferably from greater than or equal to 0.1 g/10 minutes to less than or equal to 10 g/10 minutes and most preferably from 0.5 g/10 minutes to 5 g/10 minutes.

The second ethylene polymer component (D) can have an $I_2$ melt index in the range of from 0.01 g/10 minutes to 10 g/10 minutes, preferably from 0.05 g/10 minutes to 5 g/10 minutes, more preferably from 0.05 g/10 minutes to 10 g/10 minutes, and most preferably from 0.01 g/10 minutes to 1 g/10 minutes.

The melt index of the inventive polymer composition based on polymer components (C) and (D) is preferably in the range of from 0.01 to 10 g/10 minutes, more preferably from 0.1 to 4 g/10 minutes, most preferably from 0.2 to 1.2 grams/10 minutes.

In general, the at least one first ethylene polymer component (C) has an $I_{10}/I_2$ melt flow ratio greater than 5, preferably from greater than 7, more preferably greater than 8, and most preferably in the range of from 8.5 to 20. For the inventive polymer composition itself, the $I_{10}/I_2$ melt flow ratio is preferably greater than 7.

The polymer composition used for the second aspect of the invention generally comprises or is made from from 20 to 80 weight percent of the at least one first ethylene polymer component (C), based on the total weight of the polymer composition, and preferably from 30 to 70 weight percent of the at least one ethylene polymer component (C), based on the total weight of the polymer composition.

Conversely, the inventive polymer composition comprises or is made from from 20 to 80 weight percent and preferably from 30 to 70 weight percent of the at least one second ethylene polymer component (D), based on the total weight of the polymer composition.

Broadly, suitable polymers for use as the at least one first ethylene polymer (C), include homogeneously branched substantially linear ethylene polymers and homogeneously branched linear ethylene polymers. That is, ethylene polymers characterized as having a SCBDI or CDBI greater than 50 percent are broadly useful in the present invention as the at least one-first ethylene polymer. As described and incorporated herein above, such polymers can be manufactured using a single catalyst system (e.g., a metallocene catalysts system including a suitable cocatalyst); however, preferably such polymers are manufactured using a constrained geometry system including a suitable cocatalyst such as, for example, a boron compound.

Suitable ethylene polymers for use as the at least one second component polymer (D) include substantially linear ethylene interpolymers, homogeneously branched linear ethylene interpolymers, heterogeneously branched linear ethylene interpolymers (e.g., linear low density polyethylene (LLDPE), medium density polyethylene (MDPE), high density polyethylene (HDPE) and ultra low or very low density polyethylene (ULDPE or VLDPE)), and combinations or mixtures thereof.

Substantially linear ethylene polymers are sold under the designation of AFFINITY™ and ENGAGE™ resins by The Dow Chemical Company and Dupont Dow Elastomers, respectively. Suitable homogeneously branched linear ethylene polymers for use in the invention are sold under the designation of TAFMER™ by Mitsui Chemical Corporation and under the designation of EXACT™ and EXCEED™ resins by Exxon Chemical Corporation, respectively. Suitable heterogeneously branched linear ethylene polymers for use in the invention are sold under the designations of ATTANE™ and DOWLEX™ by The Dow Chemical Company and under the designation of FLEXOMER by Union Carbide Corporation.

Preferably the at least one first ethylene polymer component (A) or (C) is a substantially linear ethylene polymer and the at least one second component polymer (B) or (D) is a heterogeneously branched linear ethylene polymer. As such, when the inventive composition is manufactured using a multiple reactor polymerization system, preferably the at least one first ethylene polymer component (A) or (C) is made using a catalyst system, polymerization conditions and the like that will make a substantially linear ethylene polymer in at least one of the reactors and likewise, the at least one second ethylene polymer component (B) or (D) is made using a catalyst system, polymerization conditions and the like that will make a heterogeneously branched linear polymer in at least one other reactor of the multiple reactor system.

Substantially linear ethylene polymers are preferred as the first ethylene polymer component (A), inter alia, due to their improved melt extrusion processability and unique Theological properties as described by Lai et. al in U.S. Pat. Nos. 5,272,236 and 5,278,272.

The substantially linear ethylene polymers used in the present invention are not in the same class as homogeneously branched linear ethylene polymers, nor heterogeneously branched linear ethylene polymers, nor are substantially linear ethylene polymers in the same class as traditional highly branched high pressure, free-radical initiated low density polyethylene (LDPE). The substantially linear ethylene polymers useful in the present invention have excellent processability, even though they have relatively narrow molecular weight distributions (MWDs). Uniquely, the melt flow ratio ($I_{10}/I_2$) of the substantially linear ethylene polymers can be varied essentially independently of the polydispersity index (i.e., molecular weight distribution ($M_w/M_n$)). This is contrasted with conventional heterogeneously branched linear polyethylene resins which have rheological properties such that as the polydispersity index increases, the $I_{10}/I_2$ value also increases. The Theological properties of substantially linear ethylene polymers also differ from homogeneously branched linear ethylene polymers which have relatively low, essentially fixed $I_{10}/I_2$ ratios.

Single site polymerization catalyst (e.g., the monocyclopentadienyl transition metal olefin polymerization catalysts described by Canich in U.S. Pat. No. 5,026,798 or by Canich in U.S. Pat. No. 5,055,438) or constrained geometry catalysts (e.g., as described by Stevens et al. in U.S. Pat. No. 5,064,802) can be used to prepare substantially linear ethylene polymers, so long as the catalysts are used consistent with the methods described in U.S. Pat. Nos. 5,272,236 and 5,278,272. Such polymerization methods are also described in PCT/US 92/08812 (filed Oct. 15, 1992). However, substantially linear ethylene polymers suitable for use in the present invention are preferably made by using suitable constrained geometry catalysts, especially constrained geometry catalysts as disclosed in U.S. application Ser. Nos.: 545,403, filed Jul. 3, 1990; 758,654, filed Sep. 12, 1991; 758,660, filed Sep. 12, 1991; and 720,041, filed Jun. 24, 1991.

Suitable cocatalysts for use herein include but are not limited to, for example, polymeric or oligomeric aluminoxanes, especially methyl aluminoxane or modified methyl aluminoxane (made, e.g., as described in U.S. Pat. Nos.: 5,041,584; 4,544,762; 5,015,749; and 5,041,585) as well as inert, compatible, non-coordinating, ion forming compounds. Preferred cocatalysts are inert, non-coordinating, boron compounds.

The polymerization conditions for manufacturing substantially linear ethylene interpolymers useful in the present invention are preferably those useful in a low pressure continuous solution polymerization process, although the application of the present invention is not limited thereto. Continuous high pressure solution polymerization, continuous slurry polymerization and continuous gas phase polymerization processes can also be used, provided the proper catalysts and polymerization conditions are also employed. To polymerize the substantially linear polymers useful in the present invention, the single site and constrained geometry catalysts mentioned earlier can be used; however, for substantially linear ethylene polymers, the polymerization process should be operated such that substantially linear ethylene polymers are indeed formed. That is, not all polymerization processes and conditions inherently make substantially linear ethylene polymers, even when proper catalysts are used. For example, in one embodiment of a polymerization process useful for manufacturing substantially linear ethylene polymers, a continuous solution process is used, as opposed to a batch solution process.

Generally, manipulation of $I_{10}/I_2$ while holding $M_w/M_n$ relatively low when manufacturing substantially linear ethylene polymers with constrained geometry catalysts is a function of reactor temperature and/or ethylene concentration. Reduced ethylene concentrations and higher reactor temperatures generally produce higher $I_{10}/I_2$ ratios as well as higher melt strength values. Generally, as the ethylene concentration in the reactor decreases, the polymer concentration in the reactor increases. For the substantially linear ethylene polymers useful in the invention, the polymer concentration for a continuous solution polymerization process is preferably above 5 weight percent of the reactor contents, especially above 6 weight percent of the reactor contents. If a narrow molecular weight distribution polymer ($M_w/M_n$ of from 1.5 to 2.5) having a higher $I_{10}/I_2$ ratio (e.g. $I_{10}/I_2$ of 7 or more, preferably at least 8, especially at least 9) is desired, the ethylene concentration in the reactor is preferably not more than 8 percent by weight of the reactor contents, especially not more than 6 percent by weight of the reactor contents, and most especially not more than 4 percent by weight of the reactor contents. Generally, the polymerization reactor temperature of the continuous process, using constrained geometry catalyst, is from 20° C. to 250° C.

Single site polymerization catalysts (e.g., the monocyclopentadienyl transition metal olefin polymerization catalysts described by Canich in U.S. Pat. No. 5,026,798 or by Canich in U.S. Pat. No. 5,055,438) can be used to prepare homogeneously branched linear ethylene polymers. As exemplified in U.S. Pat. No. 3,645,992 to Elston, homogeneously branched linear ethylene polymers can also be prepared in conventional polymerization processes using Ziegler-type catalysts such as, for example, zirconium and vanadium catalyst systems. Another example is provided in U.S. Pat. No. 5,218,071 to Tsutsui et al. Tsutsui et al. disclose the use of catalyst systems based on hafnium with impurity quantities of zirconium for the manufacture of homogeneously branched linear ethylene polymer blends. Homogeneously branched linear ethylene polymers can be prepared using any reactor system known in the art including, but not limited to, solution and gas phase polymerization utilizing for example a tank reactor(s), a sphere reactor(s), a recycling loop reactor(s) or combinations thereof and the like, any reactor or all reactors operated partially or completely adiabatically, nonadiabatically or a combination of both and the like.

Heterogeneously branched linear ethylene polymers can be prepared via the solution, slurry or gas phase polymerization of ethylene and at least one optional alpha-olefin comonomer in the presence of a Ziegler Natta catalyst by processes such as that disclosed in U.S. Pat. No. 4,076,698 to Anderson et al. Heterogeneously branched linear ethylene polymers can be manufactured by any known method and procedure, including the continuous, batch or semi-batch solution, slurry or gas phase polymerization of ethylene and at least one optional α-olefin comonomer in the presence of a Ziegler Natta catalyst, such as by the process disclosed in U.S. Pat. No. 4,076,698 by Anderson et al. Heterogeneously branched linear ethylene polymers can be prepared using any reactor system known in the art including, but not limited to, a tank reactor(s), a sphere reactor(s), a recycling loop reactor(s) or combinations thereof and the like, any reactor or all reactors operated partially or completely adiabatically, nonadiabatically or a combination of both and the like.

As described above, the preferred homogeneously branched ethylene polymer for use in the present invention is a substantially linear ethylene polymer characterized as having:

(a) a melt flow ratio, $I_{10}/I_2 \geq 5.63$, (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the linear ethylene polymer has a homogeneously branched short chain branching distribution index (SCBDI) greater than 50 percent, no long chain branching and $I_2$ and $M_w/M_n$ values within 10 percent of the $I_2$ and $M_w/M_n$ values of the substantially linear ethylene polymer and wherein the respective critical shear rates of the substantially linear ethylene polymer and the linear ethylene polymer are measured at the same melt temperature and under the same range of pressures using a gas extrusion rheometer, (d) a single differential scanning calorimetry, DSC, melting peak between −30 and 140° C., and (e) a short chain branching distribution index (SCBDI) greater than 50 percent, as determined using temperature rising elution fractionation.

The above combination of properties that characterize the substantially linear ethylene polymer useful in the invention pertains to a single component polymer and not necessarily to a polymer composition, blend or mixture comprising a substantially linear ethylene polymer as one of the component polymers.

Determination of the critical shear rate in regards to melt fracture as well as other rheology properties such as "rheological processing index" (PI) is performed using a gas extrusion rheometer (GER). The gas extrusion rheometer is described by M. Shida, R. N. Shroff and L. V. Cancio in *Polymer Engineering Science*, Vol. 17, No.11, p. 770 (1977), and in "Rheometers for Molten Plastics" by John Dealy, published by Van Nostrand Reinhold Co. (1982) on pp. 97–99, both of which are incorporated by reference herein in their entirety. GER experiments are performed at a temperature of 190° C., at nitrogen pressures between 250 and 5500 psig (1.7 to 37.9 MPa) using a 0.0754 mm diameter, 20:1 $^1$/D die with an entrance angle of 180°. For the substantially linear ethylene polymers used herein, the PI is the apparent viscosity (in kpoise) of a material measured by GER at an apparent shear stress of 2.15×106 dyne/cm². The substantially linear ethylene polymer for use in the invention have a PI in the range of 0.01 kpoise to 50 kpoise, preferably 15 kpoise or less. The substantially linear ethylene polymers used herein also have a PI less than or equal to 70 percent of the PI of a linear ethylene polymer (either a Ziegler catalyzed polymer or a homogeneously branched linear polymer as described by Elston in U.S. Pat. No. 3,645,992) having an $I_2$ and $M_w/M_n$, each within ten percent of the substantially linear ethylene polymer.

An apparent shear stress versus apparent shear rate plot is used to identify the melt fracture phenomena and quantify the critical shear rate and critical shear stress of ethylene polymers. According to Ramamurthy in the *Journal of Rheology*, 30(2), 337–357, 1986, above a certain critical flow rate, irregularities can be observed in rheometer extrudates that may be broadly classified into two main types: surface melt fracture and gross melt fracture.

Surface melt fracture occurs under apparently steady extrusion flow conditions and ranges in detail from loss of specular film gloss to the more severe form of "sharkskin." Herein, as determined using the above-described GER, the onset of surface melt fracture (OSMF) is characterized by an initial loss of extrudate gloss wherein the surface roughness of the extrudate can be conveniently detected under 40×magnification. As described in U.S. Pat. No. 5,278,272, the critical shear rate at the onset of surface melt fracture for the substantially linear ethylene interpolymers and homopolymers is at least 50 percent greater than the critical shear rate at the onset of surface melt fracture of a comparative linear ethylene polymer having essentially the same $I_2$ and $M_w/M_n$.

Gross melt fracture occurs at unsteady extrusion flow conditions and ranges in detail from regular (alternating rough and smooth, helical, etc.) to random distortions. For commercial acceptability as well as to maximize the shrink response and toughness properties of shrink films, surface defects should be minimal, if not absent. The critical shear stress at the onset of gross melt fracture for the substantially linear ethylene polymers used in the invention, especially those having a density greater than 0.910 g/cc, is greater than 4×10⁶ dynes/cm². The critical shear rate at the onset of surface melt fracture (OSMF) and the onset of gross melt fracture (OGMF) will be used herein based on the changes of surface roughness and configurations of the extrudates extruded by a GER.

As mentioned above, preferred homogeneous ethylene polymers used in the present invention are characterized by a single DSC melting peak. The single melting peak is determined using a differential scanning calorimeter (DSC) standardized with indium and deionized water. The method involves 5–7 mg sample sizes, a "first heat" to 140° C. which is held for 4 minutes, a cool down at 10°/min. to −30° C. which is held for 3 minutes, and heat up at 10° C./min. to 140° C. for the "second heat". The single melting peak is taken from the "second heat" heat flow vs. temperature curve. Total heat of fusion of the polymer is calculated from the area under the curve.

For polymers having a density of 0.875 g/cc to 0.910 g/cc, the single melting peak may show, depending on equipment sensitivity, a "shoulder" or a "hump" on the low melting side that constitutes less than 12 percent, typically, less than 9 percent, and more typically less than 6 percent of the total heat of fusion of the polymer. Such an artifact is observable for homogeneously branched polymers such as EXACT™ resins and is discerned on the basis of the slope of the single melting peak varying monotonically through the melting region of the artifact. Such an artifact occurs within 34° C., typically within 27° C., and more typically within 20° C. of the melting point of the single melting peak. The heat of fusion attributable to an artifact can be separately determined by specific integration of its associated area under the heat flow vs. temperature curve.

The Vicat softening point of the inventive compositions determined in accordance with ASTM D-1525.

Whole polymer product samples (e.g., the inventive polymer composition) and individual polymer components are analyzed by gel permeation chromatography (GPC) on a Waters 150 high temperature chromatographic unit equipped with mixed porosity columns operating at a system temperature of 140° C. The solvent is 1,2,4-trichlorobenzene, from which 0.3 percent by weight solutions of the polymer samples to be measured are prepared for injection. The flow rate is 1.0 milliliters/minute and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science, Polymer Letters*, Vol. 6, p. 621, 1968) to derive the following equation:

$$M_{polyethylene} = a^*(M_{polystyrene})^b.$$

In this equation, a=0.4316 and b=1.0. Weight average molecular weight, $M_w$, and number average molecular weight, $M_n$, are calculated in the usual manner according to the following formula: $M_j = (\Sigma w_i(M_i^j))^j$; where $w_i$ is the weight fraction of the molecules with $M_i$ eluting from the GPC column in fraction i and j=1 when calculating $M_w$ and j=−1 when calculating $M_n$.

The molecular weight distribution ($M_w/M_n$) for the substantially linear ethylene polymers and homogeneous linear ethylene polymers useful in the present invention is generally in the range from 1.2 to 2.8. The heterogeneously branched ethylene polymers useful in the invention typically have molecular weight distributions, $M_w/M_n$, in the range of from 3.5 to 4.1.

Substantially linear ethylene polymers are known to have excellent processability, despite having a relatively narrow molecular weight distribution. Unlike homogeneously and heterogeneously branched linear ethylene polymers, the melt flow ratio ($I_{10}/I_2$) of substantially linear ethylene polymers can be varied essentially independently of their molecular weight distribution, $M_w/M_n$.

Suitable homogeneously branched ethylene polymers for use in the present invention include ethylene homopolymers and interpolymers of ethylene and at least one α-olefin prepared by a low or high pressure solution process, a gas phase process or slurry process or combinations thereof. Suitable α-olefins are represented by the following formula:

$$CH_2 = CHR,$$

where R is a hydrocarbyl radical. Further, R may be a hydrocarbyl radical having from one to twenty carbon atoms and as such the formula includes $C_3$–$C_{20}$ α-olefins. Suitable α-olefins for use as comonomers include propylene, 1-butene, 1-isobutylene, 1-pentene, 1-hexene, 4-methyl-1-pentene, isopentene, 1-heptene and 1-octene, as well as other comonomer types such as styrene, halo- or alkyl-substituted styrenes, tetrafluoro-ethylene, vinyl benzocyclobutane, 1,4-hexadiene, 1,7-octadiene, and cycloalkenes, e.g., cyclopentene, cyclohexene and cyclooctene. Preferably, the at least α-olefin comonomer will be 1-butene, 1-pentene, 4-methyl-1-pentene, 1-hexene, 1-heptene, 1-octene, or mixtures thereof, as shrink films comprised of higher α-olefins will have especially improved toughness properties. However, most preferably, the at least one α-olefin comonomer will be 1-octene and the first and second ethylene polymer will be prepared in a continuous solution polymerization process.

A preferred shrink film of the present invention will be further characterized as having a compositional hexane extractive level of less than 15 percent, preferably less than 10 percent, more preferably less than 6, most preferably less than 3 percent based on the total weight of the composition.

Another preferred shrink film of the present invention will be characterized by a Vicat softening point of at least 75° C., preferably at least 85° C., and more preferably at least 90° C.

Another embodiment of the present invention is a method of making an improved shrink film either as a monolayer film or as a shrink control layer in a multilayer structure. The method of making a multilayer structure comprising the inventive shrink control layer can include a lamination and coextrusion technique or combinations thereof, and can include using the inventive polymer composition alone for all layers or other polymeric layers, and can also specifically include blown film, cast film, extrusion coating, injection molding, blow molding, thermoforming profile extrusion, pultrusion, compression molding, rotomolding, or injection blow molding operations or combinations thereof.

The inventive shrink film can be made using conventional simple bubble or cast extrusion techniques, however, preferred film structures are prepared using more elaborate techniques such as "tenter framing" or a "double bubble," "tape bubble," "trapped bubble" process or combinations thereof and the like, such that the surprising attributes of the invention can be realized. The double bubble technique is described by Pahkle in U.S. Pat. No. 3,456,044.

The inventive polymer composition used in the invention can be formed by any convenient method, including dry blending the individual components and subsequently melt mixing in a mixer or by mixing the components together directly in a mixer (e.g., a Banbury mixer, a Haake mixer, a Brabender internal mixer, or a single or twin screw extruder including a compounding extruder and a side-arm extruder employed directly down stream of a interpolymerization process.

The inventive polymer composition used in the invention (as well as the at least one first ethylene polymer and the at least one second ethylene polymer) can be formed in-situ via a multiple reactor polymerization of ethylene and at least one optional comonomer using a single-site catalyst, preferably a constrained geometry catalyst, in at least one reactor and a single-site catalysis, preferably a constrained geometry catalyst, or more preferably a Ziegler-Natta type catalyst in at least one other reactor. The reactors can be operated sequentially or in parallel. An exemplary in-situ interpolymerization process is disclosed in PCT Patent Application 94/01052.

The polymer composition used in the invention (as well as the at least one first ethylene polymer (A) or (C) and the at least one second ethylene polymer (B) or (D)) can further be formed by isolating polymer components (A), (B), (C) and/or component (D) from a heterogeneously branched ethylene polymer by fractionating the heterogeneous ethylene polymer into specific polymer fractions (or by isolating polymer components (A) or (C) from a homogeneously branched ethylene polymer by fractionating the homogeneously ethylene polymer into polymer fractions), selecting the fraction(s) appropriate to meet the limitations specified for the various polymer components, and mixing the selected fraction(s) in the appropriate amounts with the at least one first ethylene polymer component (A) or (C) or the at least one second ethylene polymer component (B) or (D). This method is obviously not as economical as an in-situ polymerization such as, for example, as described above, but can nonetheless be used to obtain the inventive polymer composition as well as the at least one first ethylene polymer and/or the at least one second ethylene polymer.

Additives, such as antioxidants (e.g., hindered phenolics, such as IRGANOX™ 1010 or IRGANOX™ 1076 supplied by Ciba Geigy), phosphites (e.g., IRGAFOS™ 168 also supplied by Ciba Geigy), cling additives (e.g., PIB), SANDOSTAB PEPQ™ (supplied by Sandoz), pigments, colorants, fillers, and the like may also be included in the inventive shrink film. Although generally not required, the inventive shrink film can also contain additives to enhance antiblocking, mold release and coefficient of friction characteristics including, but not limited to, untreated and treated silicon dioxide, talc, calcium carbonate, and clay, as well as primary, secondary and substituted fatty acid amides, release agents, silicone coatings, etc. Still other additives, such as quaternary ammonium compounds alone or in combination with ethylene-acrylic acid (EAA) copolymers or other functional polymers, can also be added to enhance the anti-static characteristics of the inventive shrink film and permit the use of the inventive shrink film in, for example, the shrink packaging of electronically sensitive goods.

The inventive shrink film can further include recycled and scrap materials and diluent polymers, to the extent that the improved toughness properties discovered by the Applicants is not adversely affected. Exemplary diluent materials include, for example, elastomers, rubbers, polypropylene, polysulfones, polycarbonates, polyamides, ABS, epoxies and anhydride modified polyethylenes (e.g., maleic anhydride grafted LLDPE and HDPE) as well as with high pressure polyethylenes such as, for example, low density polyethylene (LDPE), ethylene/acrylic acid (EAA) interpolymers, ethylene/vinyl acetate (EVA) interpolymers and ethylene/methacrylate (EMA) interpolymers, and combinations thereof.

Biaxially oriented film structures are used for their enhanced strength, barrier and/or shrink properties. Biaxially oriented film structures find utility in various packaging and storage applications for non-foodstuffs and food items such as primal and subprimal cuts of meat, ham, poultry, bacon, cheese, etc. Biaxially oriented film structures utilizing the inventive polymer composition can be a two to seven layer structure. Such a multilayer structure can be of any suitable total thickness and the inventive shrink film layer of the multilayer structure can also be of any suitable thickness. The inventive shrink film layer (i.e., a biaxially oriented film layer comprising or made from the inventive polymer composition) is typically the shrink control layer of the multilayer shrink film and can comprise from 30 to 75 weight percent of the multilayer film, preferably from 50 to 70 weight percent of the multilayer film. The inventive shrink film layer can have any suitable film thickness; preferably the inventive film layer has a film thickness from about 0.1 to 2 mils (2.5 to 51 microns), more preferably from 0.3 to 1.8 mils (7.6 to 45.7 microns).

The multilayer structure comprising, made with or made from the inventive polymer composition can also include a sealant layer composition (such as, for example, but not limited to, another polymer composition, at least one homogeneous branched substantially linear ethylene polymer, at least one homogeneously branched linear ethylene polymer, or at least one heterogeneously branched ultra or very low density polyethylene), an outer layer (such as, for example, another polymer mixture or at least one heterogeneously branched linear low density or ultra-low density polyethylene), and a core layer (such as a biaxially oriented polypropylene homopolymer or vinylidene chloride polymer) interposed between.

Adhesion promoting tie layers (such as PRIMACOR™ ethylene-acrylic acid (EAA) copolymers available from The Dow Chemical Company, and/or ethylene-vinyl acetate (EVA) copolymers, as well as additional structural layers (such as AFFINITY™ polyolefin plastomers, ENGAGE™ polyolefin elastomers, available from The Dow Chemical Company and Dupont Dow Elastomers, respectively, ultra-low density polyethylene, or blends of any of these polymers with each other or with another polymer, such as EVA) can be optionally employed.

Other layers of a multilayer structure comprising, made with or made from the inventive polymer composition can include, but are not limited to barrier layers and/or structural layers. Various materials can be used for these layers, with some of them being used as more than one layer in the same multilayer structure. Some suitable-materials include: foil, nylon, ethylene/vinyl alcohol (EVOH) copolymers, polyvinylidene chloride (PVDC), polyethylene terepthalate (PET), oriented polypropylene (OPP), ethylene/vinyl acetate (EVA) copolymers, ethylene/acrylic acid (EAA) copolymers, ethylene/methacrylic acid (EMAA) copolymers, ULDPE, LLDPE, HDPE, MDPE, LMDPE, LDPE, ionomers, graft-modified polymers (e.g., maleic anhydride grafted polyethylene), and paper.

Cook-in packaged foods are foods which are prepackaged and then cooked. The packaged and cooked foods go directly to the consumer, institution, or retailer for consumption or sale. A package for cook-in must be structurally capable of withstanding exposure to cook-in time and temperature conditions while containing a food product. Cook-in packaged foods are typically employed for the packaging of ham, turkey, vegetables, processed meats, etc. Because of the relatively high softening point to shrink response characteristic of the inventive shrink film, the shrink film of the present invention is well-suited for cook-in as well as hot-fill packaging applications.

Double bubble and trapped bubble biaxial orientation methods can be simulated on a laboratory scale using a T. M.

Long stretcher which is analogous to a tenter frame device. This device can orient polyolefin films in both the monoaxial and biaxial mode at stretching ratios up to at least 5:1. The device uses films having an original dimension of 2 inches×2 inches (5.1 centimeters×5.1 centimeters). Biaxial stretching is usually performed by stretching in the machine direction and transverse direction of the film simultaneously, although the device can be operated to stretch sequentially.

The residual crystallinity of polyolefin interpolymers (measured using a DSC partial area method) can be used to characterize the nature of polyolefin film at the orientation temperature. In general, it preferred to orient polyolefin films at a an orientation temperature where the residual crystallinity of the film is as high as possible. Such an orientation will generally be only a few degree above that temperature where the film can no longer be successfully oriented. That is, 5° C. above, preferably 3° C. above, more preferably 2.5° C. above the lowest stretch temperature (defined herein above) is considered herein to be the optimum or near-optimum stretching or orientation temperature for a particular film composition. Stretching temperatures less than 2.5° C. above the lowest stretch temperature are not preferred because they tend to yield inconsistent results due to loss of film integrity, although such inconsistencies tend to depend on specific equipment and temperature control capabilities. However, for proper comparison of various films, an orientation temperature should be selected such that the residual crystallinity at orientation is approximately the same for each film. That is, although wide orientation windows are desired, selection of the actual orientation temperature to be employed should never be arbitrary.

However, for proper comparison of various film compositions, an orientation temperature should be selected such that the residual crystallinity at the selected orientation temperature is approximately the same for each film or, alternatively, the orientation is performed at the lowest stretch temperature for each respective film composition. That is, selection of the actual orientation temperature to be employed should never be arbitrary and generally should not be held at a fixed temperature when evaluating varied film compositions.

Densities and density differentials are measured in accordance with ASTM D-792 and are reported as grams/cubic centimeter (g/cc). The measurements reported in the Examples below as overall densities were determined after the polymer samples have been annealed for 24 hours at ambient conditions in accordance with ASTM D-792.

The density and weight percent of the first ethylene polymer component (A) for Example manufactured by in situ polymerization using two reactors can determined by an Analytical Temperature Rising Elution Fractionation (ATREF) technique. The hardware and procedures used for the ATREF technique have been previously described, e.g., Wild et al, *Journal of Polymer Science*, Poly. Phys. Ed., 20,41(1982), Hazlitt, et al., U.S. Pat. No. 4,798,081 and Chum et al., U.S. Pat. No. 5,089,321. However, for the Examples provided herein, polymer compositions were all manufactured by melt extrusion on a twin screw extruder.

Vicat softening temperatures were measured in accordance with ASTM D1525. Secant modulus was measured in accordance with ASTM D882 on slow-cooled compression molded samples. Total energy drop dart and dart impact were measured in accordance with ASTM D4272 and D-1709, respectively, on oriented film samples. The total energy test unit was a Kayeness Total Energy Impact Tester, Model D-2090 wherein the total energy for a 3-pound (1.4 kilogram) weight was $\geq 8.82$ ft-lbs ($\geq 1.2$ Kg.-meter).

The following examples are provided for the purpose of explanation and are not intended to suggest any particular limitation of the present invention.

EXAMPLES

Examples 1–3 and Comparative Example 4

In an evaluation to discover the requirements for improved shrink properties, a single component ethylene polymer and three different ethylene polymer blends were evaluated. Table 1 lists the various polymers evaluated and their properties (i.e., melt index, density, Vicat softening point and description of first and second polymer components and their density differential, where applicable).

TABLE 1

| Example | Ratio of $1^{st}/2^{nd}$ | First Component | Second Component | Melt Index, g/10 min. | Polymer Composition Density g/cc | Density Differential (g/cc) | Vicat Softening Temp., ° C. |
|---|---|---|---|---|---|---|---|
| 1 | 60/40 | A | B | 0.82 | 0.9085 | 0.022 | 88.3 |
| Comp. 2 | 60/40 | C | D | 0.94 | 0.9067 | 0.050 | 80.7 |
| 3 | 40/60 | A | B* | 0.92 | 0.9075 | 0.014 | 87.1 |
| Comp. 4 | NA | NA | NA | 0.81 | 0.9059 | NA | 84.4 |

NA denotes not applicable.

Component Resin A was XU-59220.04, an experimental substantially linear ethylene/1-octene copolymer having a nominal $I_2$ melt index of 0.88 g/10 minutes and a nominal density of 0.898 g/cc as supplied by The Dow Chemical Company. Component Resin B was DOWLEX™ 2045, a linear low density ethylene/1-octene copolymer having a nominal $I_2$ melt index of 1.0 g/10 minutes and a nominal density of about 0.920 g/cc as supplied by The Dow Chemical Company. Component Resin C was AFFINITY™ CL 8003, a substantially linear ethylene/1-octene copolymer having a nominal $I_2$ melt index of 1.0 g/10 minutes and a nominal density of 0.885 g/cc as supplied by The Dow Chemical Company. Component Resin D was DOWLEX™ 2038.68, a linear low density ethylene/1-octene copolymer having a nominal $I_2$ melt index of 1.0 g/10 minutes-and a nominal density of 0.935 g/cc as supplied by The Dow Chemical Company. Component Resin B* was ATTANE™ 4201, an ultra low density ethylene/1-octene copolymer having a nominal $I_2$ melt index of 1.0 g/10 minutes and a nominal density of 0.912 g/cc as supplied by The Dow Chemical Company. Comparative Example 4 was ATTANE™ 4213, an ultra low density ethylene/1-octene copolymer having a nominal $I_2$ melt index of 0.8 g/10 minutes and a nominal density of 0.906 g/cc as supplied by The Dow Chemical Company.

Melting characterization of water quenched films of each Example was done using a Perkin-Elmer DSC-7. The DSC was calibrated using indium and water as standards. The water-quenched films were put in an aluminum pan and the samples were heated from −30° C. to 140° C. at 10° C./minute. The total heat of fusion for each resins was obtained from the area under the curve. The residual crystallinities at various temperatures were obtained using the partial area method by dropping a perpendicular at those temperatures wherein total crystallinity was taken by dividing the heat of fusion by 292 Joules/ gram.

The Examples were extruded into 30-mil (0.8-mm) cast sheets and quick quenched using a chilled roll. The melt temperature at the die was about 480° F. (249° C.) for each resin and the chill roll temperature was about 75° F. (24° C.). The cast sheets were oriented at their respective lowest orientation temperature using a T. M. Long Biaxial stretcher (a tenter framer stretcher). The initial dimensions of the cast sheets was 2 inches×2 inches (5.1 centimeter×5.1 centimeter) and the draw ratio for the stretcher was set at 4.5×4.5 and the stretching rate was 5 inches per second (12.7 cm/s). The cast sheets were pre-heated in the stretcher for about 4 minutes prior to stretching and hot air was deflected so as not to impinge on the cast sheets directly (i.e., to avoid hot spots in the cast sheets).

In this evaluation, the lowest orientation temperature was taken as the temperature that gave a percent residual crystallinity of approximately 20 percent which was approximately 5° C. above the temperature where the cast sheet would tear, show "banding" (i.e., uneven deformation) or would repeatedly dislodged itself from the grips of the stretcher during stretching at a grip pressure of about 500 psi (3.4 MPa). The orientation window was taken as the temperature range from the lowest orientation temperature to the highest DSC peak melting temperature of the sample.

The oriented cast sheets were tested for unrestrained (free) shrink at 90° C. by measuring unrestrained shrink in a water-bath at 90° C. The samples were cut into 12 cm×1.27 cm specimen. The specimen were marked with a marker exactly 10 cm. from one end for identification. Each sample was completely immersed in the water bath for five seconds and then quickly removed. Film shrinkage was obtained from the calculations in accordance with ASTM D-2732-83 and were taken from the average of four samples.

Table 2 summarizes the secant modulus, shrink response and orientation temperature for Examples 1–3 and comparative example 4:

TABLE 2

| Example | 2% Secant Modulus | Percent Shrink @ 90° C. (hot $H_2O$) | Orientation Temp C. | Weight % Crystallinity @ Orientation Temp | Orientation Window ° C. |
|---|---|---|---|---|---|
| 1 | 17,023 | 34.5 | 87.8 | 20.8 | 33 |
| Comp. 2 | 17,218 | 25.0 | 93.3 | 19.6 | 29 |
| 3 | 15,327 | 30.8 | 87.8 | 21.0 | 34 |
| Comp. 4 | 12,832 | 26.0 | 90.6 | 19.9 | 30 |

The data in Table 2 indicate that Examples 1 and 3 exhibit balanced shrink properties relative to Example 2 and comparative example 4. Examples 1 and 3 exhibited the highest shrink responses and broadest orientation windows. Inventive Example 3 exhibited a shrink response at least 18 percent higher than the single component heterogeneously branched linear ethylene polymer (comparative example 4) and Example 1 also exhibited a shrink response at least 32 percent higher than the single component heterogeneously branched linear ethylene polymer (comparative example 4). Additionally, Table 1 indicates that Examples 1 and 3 also exhibited the highest softening temperature relative to Example 2 and comparative example 4. From the results in Table 1 and Table 2, it can be seen that Example 2 does not represent the preferred embodiment of the present invention that provides balanced shrink properties.

Examples 5–8 and Comparative Example 9

In another evaluation, another single component ethylene polymer and four different ethylene polymer blends were evaluated to discover the requirements for improved shrink properties at higher polymer densities. Table 3 lists the various polymers evaluated and their properties (i.e., melt index, density, Vicat softening point and description of first and second polymer components and their density differential, where applicable).

TABLE 3

| Example | Ratio of $1^{st}/2^{nd}$ | First Component | Second Component | Melt Index, g/10 min. | Polymer Composition Density g/cc | Density Differential (g/cc) | Vicat Softening Temp., ° C. |
|---|---|---|---|---|---|---|---|
| 5 | 40/60 | A* | B | 1.0 | 0.914 | 0.018 | 96 |
| 6 | 60/40 | A** | B** | 1.28 | 0.9133 | 0.0385 | 91.5 |
| 7 | 30/70 | A | B | 0.86 | 0.9146 | 0.022 | 96 |
| 8 | 60/40 | A | B** | 0.85 | 0.9141 | 0.037 | 94 |
| Comp. 9 | NA | NA | NA | 0.92 | 0.9128 | NA | 95.8 |

NA denotes not applicable.

Component Resin A was XU-59220.04, an experimental substantially linear ethylene/1-octene copolymer having a nominal $I_2$ melt index of 0.88 g/10 minutes and a nominal density of 0.898 g/cc as supplied by The Dow Chemical Company. Component Resin A** was AFFINITY™ PF 1140, a substantially linear ethylene/1-octene copolymer having a nominal $I_2$ melt index of 1.6 g/10 minutes and a nominal density of 0.8965 g/cc as supplied by The Dow Chemical Company. Component Resin A* was AFFINITY™ PL 1880, a substantially linear ethylene/1-octene copolymer having a nominal $I_2$ melt index of 1.0 g/10 minutes and a nominal density of 0.902 g/cc as supplied by The Dow Chemical Company. Component Resin B** was DOWLEX™ 2038.68, a linear low density ethylene/1-octene copolymer having a nominal $I_2$ melt index of 1.0 g/10 minutes and a nominal density of 0.935 g/cc as supplied by The Dow Chemical Company. Component Resin B was DOWLEX™ 2045A, a linear low density ethylene/1-octene copolymer having a nominal $I_2$ melt index of 1.0 g/10 minutes and a nominal density of 0.920 g/cc as supplied by The Dow Chemical Company. Comparative example 9 was DOWLEX™ 2256A, a linear low density ethylene/1-octene copolymer having a nominal $I_2$ melt index of 0.9 g/10 min. and a nominal density of 0.913 g/cc as supplied by The Dow Chemical Company.

The test methods and procedures used for Examples 5 and 7 and comparative examples 6, 8 and 9 were the same for Example 1, except instead of a water-bath to induce shrinkage, hot oil at 105° C. was used and the orientation temperature was taken at approximately 21% residual crystallinity rather than at approximately 20%. Table 4 summarizes the various results.

crystallinity at the orientation temperature of the water-quenched films, and the Vicat softening points are shown in Table 5. The samples consisted of Examples 10–12 and comparative examples 13–18. Examples 10–12 as well as comparative examples 13 and 14 were all prepared by melt mixing the respective component polymers together in a compound extruder at a melt temperature of 350° F. (177° C.). Comparative example 15 was an EXCEED™ plastomer supplied by Exxon Chemical Company. Comparative examples 16–18 was DOWLEX™ 2045, DOWLEX™ 2256A and ATTANE™ 4213, respectively, all supplied by The Dow Chemical Company. Both DOWLEX™ 2045 and 2256A are linear low density ethylene/1-octene copolymers and ATTANE™ 4213 is an ultra low density ethylene/1-octene copolymer.

Shrinkage values were obtained by measuring unrestrained shrink after separate exposures to a hot-water bath kept at about 90° C. and a hot-oil bath kept at about 105° C. Before exposure to the baths, the various samples were cut 12 cm×1.27 cm specimens and were marked with a marker exactly 10 cm. from one end for identification. After marking each sample, each sample was completely immersed in the water bath or hot oil bath for about five seconds and them removed. Film shrinkage (as the average of four determi-

TABLE 4

| Example | 2% Secant Modulus psi (MPa) | Percent Shrink @ 105° C. (hot oil) | Orientation Temp, ° C. | Weight % Crystallinity @ Orientation Temp | Orientation Window ° C. |
|---|---|---|---|---|---|
| 5 | 21,683 (149) | 44.5 | 96.1 | 20.6 | 25 |
| 6 | 21,593 (149) | 35.8 | 97.8 | 21.8 | 23 |
| 7 | 23,692 (163) | 41.3 | 96.1 | 22.5 | 25 |
| 8 | 24,204 (167) | 37.8 | 98.3 | 21.9 | 23 |
| Comp. 9 | 18,770 (129) | 38 5 | 98.3 | 21.0 | 23 |

The data in Table 4 indicate that Examples 5 and 7 exhibit balanced shrink properties relative to Examples 6 and 8 and comparative example 9. In this evaluation, Examples 5 and 7 exhibited the highest shrink responses and equivalent to broader orientation windows. Further, Table 3 above indicates that Examples 5 and 7 also exhibited the highest softening temperature relative to Examples 6 and 8. From the results in Tables 3 and 4, it can be seen that Examples 6 and 8 do not represent the preferred embodiment of the present invention that provides balanced shrink properties.

Examples 10–12 and Comparative Examples 13–18

In an evaluation to determinate the heat shrink response and toughness of various polymer compositions, nine different compositions were made into 30-mil (0.8 mm) thick, quick quenched cast sheets.

In this evaluation, melting characterization of each Example was performed as described above for Example 1 using a Perkin-Elmer DSC-7. The cast extruded sheets were quick quenched using a chilled roll. The cast extrusion melt temperature at the die was 480° F. (249° C.) and the chill roll temperature was 75° F. (24° C.). The cast sheets were oriented at their respective lowest orientation temperature using a T. M. Long Biaxial stretcher as described above for Example 1.

The component polymer descriptions (where applicable) and orientation temperatures for all the samples as well as their respective DSC peak melting temperatures, the residual nations for each sample) was obtained from calculations in accordance with ASTM D2732-83 for each shrunken specimen. Table 6 reports the shrinkage data for the various samples as well as film toughness on the oriented film samples as determined by a total energy dart method using a 3 pound dart in accordance with the ASTM D4272. Since the samples were equi-biaxially oriented (4.5×4.5), the shrinkage in the machine direction (MD shrink) and cross direction (CD shrink) were same.

Table 6 indicates that Examples 10 and 11 have excellent toughness properties. The toughness properties of the Examples 10 and 11 was determined to be superior to those of Example 12 as well as comparative examples 13 and 14, all three of which also comprise or are made from two component polymers. However, unlike Examples 10 and 11, for Example 12 and comparative examples 13 and 14, their respective first polymer component had a higher molecular weight (as determined by $I_2$ melt index measurements in accordance with ASTM D-1238 Condition 190° C./2.16 kg) than their respective second polymer component. The molecular weight difference between the component polymers of Example 12 and comparative examples 13 and 14 is in contradistinction to that of Examples 10 and 11. That is, in contrast to Example 12 and comparative examples 13 and 14, Examples 10 and 12 both comprise and are made from a second polymer component that has a higher molecular weight and higher density than their first polymer component. Hence, from the results in Tables 5 and 6, it can be seen that Example 12 is not representative of the embodiment of the present invention that provides improved shrink film toughness.

Table 6 also indicates that the oriented film toughness of Examples 10 and 11 is comparable to the homogeneously-branched EXCEED™ resin available from Exxon Chemical Company as well as to the heterogeneously branched ATTANE™ 4213 resin and the heterogeneously branched DOWLEX™ LLDPE resin 2256A, both available from The Dow Chemical Company.

FIG. 3 is a plot of the shrink response at 90° C. in water and 105° C. in hot oil versus polymer composition density for Examples 10–12 and comparative examples 13 and 14. The data for FIG. 3 are taken from Tables 5 and 6. FIG. 3 indicates that Examples 10 and 11 also possess a relatively high shrink response. That is, the shrink responses of the Examples 10 and 11 was at least equivalent to (if not superior to) that of Example 12 and comparative examples 13 and 14 when measured at equivalent polymer composition densities.

In another evaluation, various Comparative polymer compositions were oriented using a hot-blown orientation technique. In this evaluation, the same polymer compositions as shown in Table 1 for Example 12 and comparative examples 14–18 were fabricated at a high blow-up ratio (i.e., 2.5:1) into 2 mil (0.051 mm) thick monolayer hot-blown (tubular) film samples at about 200° C. melt temperature using a 2.5 inch (6.4 cm) diameter, 30:1 L/D Gloucester blown film line equipped with a 6 inch (15.2 cm) annular die. Table 7, below, provides some of the fabrication details for the evaluation as well as the dart impact properties of the various hot-blown shrink films.

TABLE 7

| Example | Output, lbs/hr | Amps | Die Pressure, psi (MPa) | Melt Temp., ° F. (° C.) | Film Thickness, mils (microns) | Dart Impact** grams |
|---|---|---|---|---|---|---|
| Ex. 12HB* | 120 | 83 | 5,430 (37.4) | 450 (232) | 2 (51) | >850 |
| Comp. Ex 14HB | 120 | 70 | 4,230 (29.2) | 450 (232) | 2 (51) | >850 |

TABLE 5

| Example | Weight Percent First Polymer | First Polymer Density, g/cc | First Polymer $I_2$, g/10 min. | Weight Percent Second Polymer | Second Polymer Density, g/cc | Second Polymer $I_2$, 10 min. | Polymer Composition $I_2$, g/10 min. | Polymer Composition Density, g/cc | Density Differential g/cc | Polymer Composition $I_{10}/I_2$ | Polymer Composition Vicat, ° C. | Polymer Composition Melting Peak, ° C. |
|---|---|---|---|---|---|---|---|---|---|---|---|---|
| 10 | 72 | 0.915 | 1.0 | 28 | 0.926 | 1.0 | 0.86 | 0.9193 | 0.011 | 10.3 | 105.7 | 114.9 |
| 11 | 60 | 0.885 | 1.0 | 40 | 0.935 | 1.0 | 0.94 | 0.9067 | 0.050 | 8.2 | 80.7 | 121.8 |
| 12 | 38 | 0.906 | 0.3 | 62 | 0.929 | 1.6 | 0.87 | 0.9205 | 0.023 | 7.4 | 107.3 | 123.1 |
| 13* | 26 | 0.883 | 1.2 | 74 | 0.923 | 1.7 | 1.55 | 0.9116 | 0.040 | 7.7 | 89.8 | 123.2 |
| 14* | 38 | 0.892 | 0.3 | 62 | 0.936 | 1.6 | 0.84 | 0.9208 | 0.044 | 7.3 | 106.9 | 122.5 |
| 15* | | | | | | | 0.96 | 0.920 | NA | 6.1 | 105.3 | 116.8 |
| 16* | | | | | | | 0.96 | 0.9202 | NA | 7.9 | 105.2 | 120.9 |
| 17* | | | | | | | 0.92 | 0.9128 | NA | 8.1 | 95.8 | 121.1 |
| 18* | | | | | | | 0.81 | 0.9059 | NA | 8.2 | 84.4 | 121.4 |

*Denotes the example is not an example of the present invention; the example is provide for comparative purposes only.
Examples 10 and 11 were prepared by melt compound extrusion at about 350° F. (177° C.). Example 12 and comparative examples 13 and 14 were all manufactured using a multiple reactor polymerization system.

TABLE 6

| Example | Orientation Temperature ° C. | Percent Crystallinity @ Orientation Temperature. | Percent Shrink Hot Water @ 90° C. | Percent Shrink Hot-Oil @ 105° C. | Film Thickness mils (microns) | Total Energy Dart, ft-lbs | 1% Secant Modulus psi (MPa) |
|---|---|---|---|---|---|---|---|
| 10 | 106 | 21.5 | 6.5 | 16.5 | 1.90 (48) | no break | 29,250 (202) |
| 11 | 93 | 19.6 | 25.0 | 45.0 | 2.20 (56) | no break | 19,504 (134) |
| 12 | 112 | 21.4 | 7.0 | 15.0 | 1.40 (36) | 6.4 | 31,985 (221) |
| 13* | 102 | 22.6 | 13.3 | 30.8 | 1.70 (43) | 5.1 | 24,727 (170) |
| 14* | 112 | 21.1 | 7.0 | 15.5 | 1.40 (36) | 5.6 | 34,412 (237) |
| 15* | 107 | 18.1 | 8.7 | 20.8 | 1.40 (36) | no break | 31,536 (217) |
| 16* | 107 | 21.1 | 8.5 | 18.3 | 1.45 (37) | no break | 30,089 (207) |
| 17* | 98 | 21.0 | 15.8 | 38.5 | 1.80 (46) | no break | 21,976 (152) |
| 18* | 93 | 17.9 | 23.8 | 52.8 | 1.95 (50) | no break | 14,706 (101) |

*Denotes the example is not an example of the present invention; the example is provide for comparative purposes only.
Examples 10 and 11 were prepared by melt compound extrusion at about 350° F. (177° C.). Example 12 and comparative examples 13 and 14 were all manufactured using a multiple reactor polymerization system.

TABLE 7-continued

| Example | Output, lbs/hr | Amps | Die Pressure, psi (MPa) | Melt Temp., °F. (°C.) | Film Thickness, mils (microns) | Dart Impact** grams |
|---|---|---|---|---|---|---|
| Comp. Ex 15HB | 110 | 95 | 4,890 (33.7) | 454 (234) | 2 (51) | >850 |
| Comp. Ex 16HB | 120 | 80 | ND | 450 (232) | 2 (51) | 331 |
| Comp. Ex 17HB | 120 | 77.5 | 4,945 (34.1) | 450 (232) | 2 (51) | 780 |
| Comp. Ex 18HB | 120 | ND | 6,170 (42.5) | ND | 2 (51) | >850 |

*Denotes the example is not an example of the present invention; the example is provided for comparative purposes only.
**Dart impact measured in accordance with method B of ASTM D-1709 wherein >850 grams corresponds to "no break."
ND denotes not determined Contrary to Table 6 above, Table 7 indicates that the polymer compositions of Example 12 and comparative example 14 (see Examples 12HB and comparative example 14HB) provide excellent toughness properties when orientation is accomplished by a simple hot-blown technique. Whereas Table 7 indicates that, ordinarily, excellent toughness should be expected for polymer compositions comprising and made from at least two polymer components, Table 6 indicates such is not necessarily the case for two-component polymer compositions where orientation is accomplished by an elaborate orientation technique.

From these results, we believe the present invention permits the preparation of oriented shrink film with toughness and bubble stability (including a more efficient irradiation crosslink response prior to substantial stretching) superior to polymer compositions such as EXCEED™ resins, EXACT™ resins, DOWLEX™ LLDPE resins and ATTANE™ ULDPE resins. In the present invention, improved shrink film toughness can be accomplished where the molecular weight of the second polymer component is not only higher than the first polymer component of the inventive polymer composition, but is also substantially higher than the molecular weight of single component polymer composition, although the final compositions have essentially the same overall molecular weight (as determined by their respective $I_2$ melt index measured in accordance with ASTM D-1238 Condition 190° C./2.16 kg).

We also believe the teaching herein is applicable to polymer compositions comprising and made from at least one first polymer component and at least one second polymer component wherein the at least one first polymer component is a heterogeneously branched ethylene polymer (and as such both polymer components are heterogeneously branched ethylene polymers). However, the combination of at least one first polymer component that is a homogeneously branched ethylene polymer with at least one second polymer component which is either a homogeneously or heterogeneously branched ethylene polymer has the advantage of permitting-more precise control in product design. This advantage is of particular commercial importance when it is necessary to more precisely choose the melting point or density of the polymer composition to ensure a desired level of shrinkage at the shrink temperature required or dedicated by a particular application.

FIG. 4 is a plot of the 1 percent secant modulus (in psi) versus polymer composition density (in g/cc) for Examples 10–12 and comparative examples 13–18. The data for FIG. 4 were taken from Tables 5 and 6. FIG. 4 indicates that Examples and 11 are characterized by a relatively high modulus at polymer composition densities below 0.919 g/cc and equivalent modulus at polymer composition densities above 0.919 g/cc. That is, the 1 percent secant modulus of the inventive Examples was higher than that of comparative examples 15–18 when measured at equivalent densities below 0.919. Relatively high modulus at lower densities provides the commercial advantage of improved machinability and handling in automated packaging operations together with higher shrink responses.

We claim:

1. A shrink film comprising a polymer composition, the polymer composition characterized as having a density in the range of 0.88 gram/centimeter (g/cc) to 0.94 g/cc, as determined in accordance with ASTM D-792, and as comprising and made from from 20 to 80 weight percent, based on the total weight of the polymer composition, of at least one first ethylene polymer characterized as having
   (i) a one or more melting peak, as determined using differential scanning calorimetry (DSC), and
   (ii) a density in the range of 0.87 (g/cc) to 0.93 g/cc, as determined in accordance with ASTM D-792, and from 20 to 80 weight percent, based on the total weight of the polymer composition, of at least one second ethylene polymer characterized as having
   (i) one or more melting peaks, as determined using differential scanning calorimetry (DSC), and
   (ii) a density in the range of 0.89 (g/cc) to 0.96 g/cc, as determined in accordance with ASTM D-792, and wherein the density differential between the first and second ethylene polymer components, determined in accordance with ASTM D-792, is in the range of from 0 to 0.018 g/cc.

2. A shrink film comprising a polymer composition, the polymer composition characterized as having a density in the range of 0.88 gram/centimeter (g/cc) to 0.94 g/cc, as determined in accordance with ASTM D-792, and as comprising and made from (A) from 20 to 80 weight percent, based on the total weight of the polymer composition, of at least one first ethylene polymer characterized as having
   (i) a single melting peak, as determined using differential scanning calorimetry (DSC), or a single Analytical Temperature Rising Elution Fractionation (ATREF) peak, and
   (ii) a density in the range of 0.87 (g/cc) to 0.93 g/cc, as determined in accordance with ASTM D-792, and (B) from 20 to 80 weight percent, based on the total weight of the polymer composition, of at least one second ethylene polymer characterized as having
   (i) one or more melting peaks, as determined using differential scanning calorimetry (DSC), and
   (ii) a density in the range of 0.89 (g/cc) to 0.96 g/cc, as determined in accordance with ASTM D-792, wherein the density differential between the first and second ethylene polymer components, determined in accordance with ASTM D-792, is in the range of from 0 to 0.018 g/cc.

3. A shrink film comprising a polymer composition, the polymer composition having a density in the range of from 0.88 gram/centimeter (g/cc) to 0.94 g/cc, and comprising and made from (C) from 20 to 80 weight percent, based on the total weight of the polymer composition, of at least one first ethylene polymer, wherein the at least one first ethylene polymer is manufactured using a single site metallocene or constrained geometry catalyst system and is characterized as having:
  (i) one or more melting peaks, as determined using differential scanning calorimetry (DSC),
  (ii) a short chain branching index (SCBDI) or composition distribution branching index (CDBI) greater than 50 percent, as determined using temperature rising elution fractionation,
  (iii) a melt index, as determined in accordance with ASTM D-1238, and
  (iv) a density in the range of from 0.87 (g/cc) to 0.93 g/cc, and
(D) from 20 to 80 weight percent, based on the total weight of the polymer composition, of at least one second ethylene polymer characterized as having:
  (i) one or more melting peaks, as determined using differential scanning calorimetry (DSC),
  (ii) a melt index, as determined in accordance with ASTM B-1238, equal to or lower than the melt index of the first ethylene polymer and
  (iii) a density in the range of from 0.89 (g/cc) to 0.96 g/cc,
wherein the density differential between the first and second ethylene polymer components (C) and (D) is in the range of from 0.001 to 0.018 g/cc and the density of the at least one first ethylene polymer (C) is lower than the density of the least one second ethylene polymer (D), and wherein the density for polymer components (C) and (D) and for the polymer composition is determined in accordance with ASTM D-792.

4. The shrink film of any of claims 1, 2 or 3 wherein the at least one first ethylene polymer is a substantially linear ethylene polymer which is characterized as having:
  (a) a melt flow ratio, $I_{10}/I_2 \geq 5.63$,
  (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the linear ethylene polymer has a homogeneously branched short chain branching distribution index (SCBDI) greater than 50 percent, no long chain branching and $I_2$ and $M_w/M_n$ values within 10 percent of the $I_2$ and $M_w/M_n$ values of the substantially linear ethylene polymer and wherein the respective critical shear rates of the substantially linear ethylene polymer and the linear ethylene polymer are measured at the same melt temperature and under the same range of pressures using a gas extrusion rheometer, and
  (d) a single differential scanning calorimetry, DSC, melting peak between −30 and 140° C.

5. The shrink film of any of claims 1, 2 or 3 wherein the density differential is in the range from 0 to 0.02 g/cc.

6. The shrink film of any of claims 1, 2 or 3 wherein the density differential is in the range from 0 to 0.015 g/cc.

7. The shrink film of any of claims 2 or 3 wherein the film is a monolayer film structure.

8. The shrink film of any of claims 2 or 3 wherein the film is a multilayer film structure.

9. The shrink film of any of claims 1, 2 or 3, wherein the at least one first ethylene polymer is a substantially linear ethylene polymer which is a copolymer of ethylene and at least one $C_3$–$C_{20}$ α-olefin and is characterized as having:
  (a) a melt flow ratio, $I_{10}/I_2 \geq 5.63$,
  (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the linear ethylene polymer has a homogeneously branched short chain branching distribution index (SCBDI) greater than 50 percent, no long chain branching and $I_2$ and $M_w/M_n$ values within 10 percent of the $I_2$ and $M_w/M_n$ values of the substantially linear ethylene polymer and wherein the respective critical shear rates of the substantially linear ethylene polymer and the linear ethylene polymer are measured at the same melt temperature and under the same range of pressures using a gas extrusion rheometer, and
  (d) a single differential scanning calorimetry, DSC, melting peak between −30 and 140° C.

10. The shrink film of any of claims 1, 2 or 3, wherein the at least one first ethylene polymer is a substantially linear ethylene polymer which is a copolymer of ethylene and 1-octene and is characterized as having:
  (a) a melt flow ratio, $I_{10}/I_2 \geq 5.63$,
  (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the linear ethylene polymer has a homogeneously branched short chain branching distribution index (SCBDI) greater than 50 percent, no long chain branching and $I_2$ and $M_w/M_n$ values within 10 percent of the $I_2$ and $M_w/M_n$ values of the substantially linear ethylene polymer and wherein the respective critical shear rates of the substantially linear ethylene polymer and the linear ethylene polymer are measured at the same melt temperature and under the same range of pressures using a gas extrusion rheometer, and
  (d) a single differential scanning calorimetry, DSC, melting peak between −30 and 140° C.

11. The shrink film of any of claims 1, 2 or 3, wherein the at least one first ethylene polymer is a substantially linear ethylene polymer characterized as having:
  (a) from about 0.01 to about 3 long chain branches/1000 carbons,
  (b) a melt flow ratio, $I_{10}/I_2 \leq 5.63$,
  (c) a molecular weight distribution, $M_w/M_n$, as determined by gel permeation chromatography and defined by the equation:

$$(M_w/M_n) \leq (I_{10}/I_2) - 4.63,$$

(d) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the linear ethylene polymer has a homogeneously branched short chain branching distribution index (SCBDI) greater than 50 percent, no long chain branching and $I_2$ and $M_w/M_n$ values within 10 percent of the $I_2$ and $M_w/M_n$ values of the substantially linear ethylene polymer and wherein the respective critical shear rates of the substantially linear ethylene polymer and the linear ethylene polymer are measured at the same melt temperature and under the same range of pressures using a gas extrusion rheometer, and (e) a single differential scanning calorimetry, DSC, melting peak between −30 and 140° C.

12. The shrink film of claim 1, wherein the film is a biaxially oriented shrink film having free shrinkage in the machine direction and transverse directions.

13. The shrink film of any of claims 2 or 3, wherein the film is a multilayer film structure and includes a sealant layer comprising at least homogeneously branched ethylene polymer.

14. The shrink film of any of claims 2 or 3, wherein the film is a multilayer film structure and includes a sealant layer which comprises at least one homogeneously branched ethylene polymer or a blend of at least one homogeneously branched ethylene polymer and at least one high pressure free radical initiated ethylene polymer selected from the group consisting of a low density polyethylene, an ethylene/acrylic acid interpolymer, an ionomer of an ethylene/acrylic acid interpolymer, an ethylene/vinyl acetate interpolymer, an ethylene methacrylic acid interpolymer, an ionomer of an ethylene/methacrylic acid interpolymer and an ethylene/methacrylate interpolymer.

15. A method of making a shrink film having balanced properties comprising (a) providing a polymer composition having a density in the range of about 0.88 gram/centimeter (g/cc) to about 0.94 g/cc as determined in accordance with ASTM D-792 and which comprises and is made from
   i. from about 20 to about 80 weight percent, based on the total weight of the polymer composition, of at least one first ethylene polymer characterized as having a single melting peak as determined using differential scanning calorimetry (DSC) or a single Analytical Temperature Rising Elution Fractionation (ATREF) peak and a density in the range of about 0.87 (g/cc) to about 0.93 g/cc as determined in accordance with ASTM D-792, and
   ii. from about 20 to about 80 weight percent, based on the total weight of the polymer composition, of at least one second ethylene polymer characterized as having one or more melting peaks as determined using differential scanning calorimetry (DSC) and a density in the range of about 0.89 (g/cc) to about 0.96 g/cc as determined in accordance with ASTM D-79,
wherein the density differential between the first and second ethylene polymer components, determined in accordance with ASTM D-792, is in the range of from about 0 to about 0.018 g/cc, (b) fabricating the polymer composition into a substantially unoriented film, (c) thereafter stretching the fabricated substantially unoriented film structure at a selected stretching rate, stretch ratio and stretching temperature, and (d) collecting the oriented film.

16. A method of making a shrink film having improved toughness comprising a. providing a polymer composition having a density in the range of from about 0.88 gram/centimeter (g/cc) to about 0.94 g/cc and which comprises and is made from
   i. from about 20 to about 80 weight percent, based on the total weight of the polymer composition, of at least one first ethylene polymer, wherein the at least one first ethylene polymer is manufactured using a single site metallocene or constrained geometry catalyst system and is characterized as having:
      (a) one or more melting peaks, as determined using differential scanning calorimetry (DSC),
      (b) a short chain branching index (SCBDI) or composition distribution branching index (CDBI) greater than about 50 percent,
      (c) a melt index determined in accordance with ASTM D-1238, and
      (d) a density in the range of from about 0.87 (g/cc) to about 0.93 g/cc, and
   ii. from about 20 to about 80 weight percent, based on the total weight of the polymer composition, of at least one second ethylene polymer characterized as having:
      (a) one or more melting peaks, as determined using differential scanning calorimetry (DSC),
      (b) a melt index equal to or lower than the melt index of the first ethylene polymer, as determined in accordance with ASTM B-1238, and
      (c) a density in the range of from about 0.89 (g/cc) to about 0.96 g/cc,
wherein the density differential between the first and second ethylene polymer components is in the range of from about 0.001 to about 0.018 g/cc and the density of the at least one first ethylene polymer is lower than the density of the least one second ethylene polymer, and wherein the density of the at least one first ethylene polymer, the least one second ethylene polymer and the polymer composition is determined in accordance with ASTM D-792;

b. fabricating the polymer composition into a substantially unoriented film;

c. thereafter stretching the fabricated substantially unoriented film structure at a selected stretching rate, stretch ratio and stretching temperature; and d. collecting the oriented film.

17. The method of any of claims 15 or 16, wherein the film is oriented using an elaborate orientation technique selected from the group consisting of tenter framing, double bubble orientation, trapped bubble orientation and tape orientation.

* * * * *